(12) United States Patent
Czanta et al.

(10) Patent No.: US 7,482,044 B2
(45) Date of Patent: Jan. 27, 2009

(54) LIQUID CRYSTALLINE MEDIUM AND LIQUID CRYSTAL DISPLAY

(75) Inventors: Markus Czanta, Darmstadt (DE); Melanie Klasen-Memmer, Heuchelheim (DE); Lars Lietzau, Darmstadt (DE)

(73) Assignee: Merck Patent Gesellschaft Mit Beschrankter Haftung, Darmstadt (DE)

( * ) Notice: Subject to any disclaimer, the term of this patent is extended or adjusted under 35 U.S.C. 154(b) by 0 days.

(21) Appl. No.: 11/783,192

(22) Filed: Apr. 6, 2007

(65) Prior Publication Data

US 2007/0235688 A1 Oct. 11, 2007

(30) Foreign Application Priority Data

Apr. 7, 2006 (EP) .................................. 06007391

(51) Int. Cl.
| | |
|---|---|
| *C09K 19/34* | (2006.01) |
| *C09K 19/30* | (2006.01) |
| *C09K 19/12* | (2006.01) |
| *C09K 19/32* | (2006.01) |
| *C07D 309/02* | (2006.01) |
| *C07D 309/08* | (2006.01) |
| *C07D 319/06* | (2006.01) |
| *C07C 25/00* | (2006.01) |

(52) U.S. Cl. ............... 428/1.3; 252/299.61; 252/299.62; 252/299.63; 252/299.66; 549/356; 549/369; 549/428; 570/131

(58) Field of Classification Search ............ 252/299.61, 252/299.62, 299.63, 299.66; 428/1.1, 1.3; 549/356, 369, 428; 570/131
See application file for complete search history.

(56) References Cited

FOREIGN PATENT DOCUMENTS

| WO | WO 2004/026991 A | 4/2004 |
|---|---|---|
| WO | WO 2004/050796 A | 6/2004 |
| WO | WO 2007/045382 | * 4/2007 |

* cited by examiner

*Primary Examiner*—Shean C Wu
(74) *Attorney, Agent, or Firm*—Millen, White, Zelano & Branigan, P.C.

(57) ABSTRACT

Disclosed are compounds of formula I

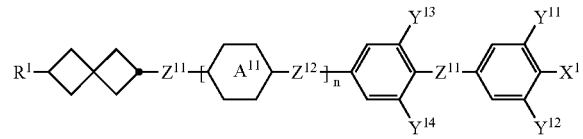

and dielectrically positive liquid crystalline media comprising a dielectrically positive component, component A, comprising a dielectrically positive compound of formula I, and optionally a second dielectrically positive component, component B, comprising one or more dielectrically positive compounds having a dielectric anisotropy of more than 3, and optionally a dielectric neutral component, component C, as well as to liquid crystal displays comprising these media, especially to active matrix displays and in particular to TN and to IPS displays.

20 Claims, No Drawings

LIQUID CRYSTALLINE MEDIUM AND LIQUID CRYSTAL DISPLAY

The present invention relates to liquid crystalline media and to liquid crystal displays comprising these media, especially to displays addressed by an active matrix and in particular to displays of the Twisted Nematic (TN) or of the In Plane Switching (IPS) type.

Liquid Crystal Displays (LCDs) are widely used to display information. LCDs are used for direct view displays, as well as for projection type displays. Electro-optical modes employed are, e.g., the twisted nematic (TN)-, the super twisted nematic (STN)-, the optically compensated bend (OCB)- and the electrically-controlled birefringence (ECB)-mode with their various modifications, as well as others. All these modes use an electrical field, which is substantially perpendicular to the substrates, respectively to the liquid crystal layer. Besides these modes there are also electro-optical modes employing an electrical field substantially parallel to the substrates, respectively the liquid crystal layer, like, e.g., the In-Plane Switching mode (as disclosed, e.g., in DE 40 00 451 and EP 0 588 568). Especially this electro-optical mode is used for LCDs for modern desktop monitors and is envisaged to be applied for displays for multi media applications. The liquid crystals according to the present invention are preferably used in these types of displays.

For these displays new liquid crystalline media with improved properties are required. Especially the response times have to be improved for many types of applications. Thus, liquid crystalline media with lower viscosities ($\eta$), especially with lower rotational viscosities ($\gamma_1$) are preferred. The rotational viscosity preferably is 75 mPa·s or less, preferably 60 mPa·s or less and especially 55 mPa·s or less. Besides this parameter, the media preferably exhibits a suitably wide range of the nematic phase, an appropriate birefringence ($\Delta n$) and dielectric anisotropy ($\Delta \epsilon$) should be high enough to allow a reasonably low operation voltage. Preferably, $\Delta \epsilon$ should be higher than 4, and very preferably higher than 5, preferably, however, not higher than 15 and in particular not higher than 12, as this would be detrimental for an at least reasonably high specific resistivity.

The displays according to the present invention are preferably addressed by an active matrix (active matrix LCDs, short AMDs), preferably by a matrix of thin film transistors (TFTs). However, the inventive liquid crystals can also beneficially be used in displays with other known addressing means.

There are various different display modes using composite systems of liquid crystal materials of low molecular weight together with polymeric materials. These are, e.g., polymer dispersed liquid crystal (PDLC)-, nematic curvi-linearly aligned phase (NCAP)- and polymer network (PN)-systems, as disclosed, for example, in WO 91/05 029 or axially symmetric microdomain (ASM) systems and others. In contrast to these, the modes especially preferred according to the instant invention are using the liquid crystal medium as such, oriented on surfaces. These surfaces typically are pre-treated to achieve uniform alignment of the liquid crystal material The display modes according to the instant invention preferably use an electrical field substantially parallel to the composite layer.

Liquid crystal compositions suitable for LCDs and especially for IPS displays are known, e.g., from JP 07-181 439 (A), EP 0 667 555, EP 0 673 986, DE 195 09 410, DE 195 28 106, DE 195 28 107, WO 96/23 851 and WO 96/28 521. These compositions, however, do have significant drawbacks. Most of them, amongst other deficiencies, lead to unfavorably long response times, have too low values of the resistivity and/or require operation voltages, which are too high.

Thus, there is a significant need for liquid crystalline media with suitable properties for practical applications such as a wide nematic phase range, appropriate optical anisotropy $\Delta n$, according to the display mode used, a high $\Delta \epsilon$ and especially low viscosities.

Surprisingly, it now has been found that liquid crystalline media with a suitably high $\Delta \epsilon$, a suitable phase range, and $\Delta n$ can be realized, which do not exhibit the drawbacks of the materials of the prior art or at least do exhibit them to a significantly lesser degree.

These improved liquid crystalline media according to the instant application are comprising at least the following components:

a first dielectrically positive component, component A, comprising one or more dielectrically positive compounds of formula I

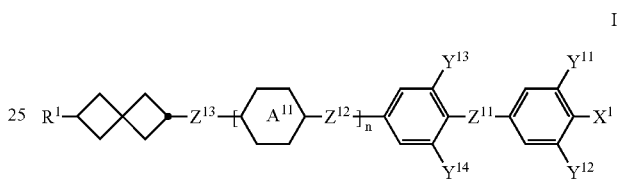

wherein $R^1$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and $R^2$ and $R^3$ preferably are alkyl or alkenyl,

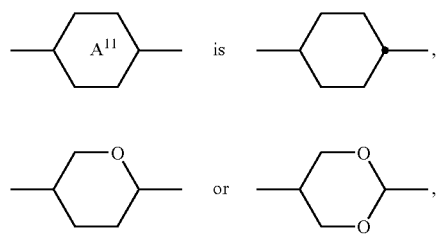

preferably

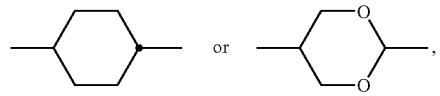

$X^1$ is halogen, halogenated alkyl or alkoxy with 1 to 6 C-atoms or halogenated alkenyl or alkenyloxy with 2 to 6 C-atoms, preferably F, Cl, —OCF$_3$ or —CF$_3$, most preferably F, Cl or —OCF$_3$, $Y^{11}$ to $Y^{14}$ are, independently of each other, H or F, $Z^{11}$ to $Z^{13}$ are, independently of each other, —CH$_2$CH$_2$—, —CF$_2$CF$_2$—, —COO—, trans- —CH=CH—, trans- —CF=CF—, —CH$_2$O—, —O CH$_2$—, —CF$_2$O—, —O CF$_2$— or a single bond, preferably —CH$_2$CH$_2$—, —COO—, trans- —CH=CH—, —CF$_2$O—, —O CF$_2$— or a single bond and most preferably —COO—, trans- —CH=CH—, —CF$_2$O—, —O CF$_2$— or a single bond, particularly at least one, preferably one of $Z^{11}$ to $Z^{13}$, is —$CF_2O$— or —$OCF_2$—, and
n is 0 or 1 and
optionally, however preferably, a second dielectrically positive component, component B, comprising one or more dielectrically positive compounds having a dielectric anisotropy of more than 3, from which compounds of formula I are excluded, preferably compounds of formulae II or III

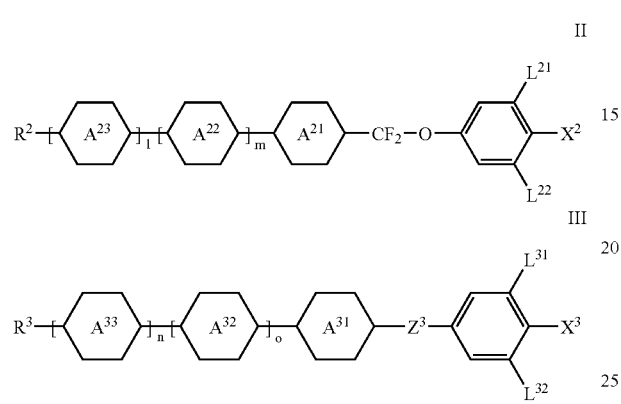

wherein
$R^2$ and $R^3$, independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and $R^2$ and $R^3$ preferably are alkyl or alkenyl,

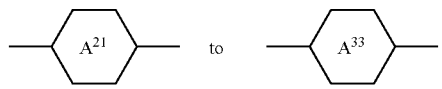

are, independently of each other,

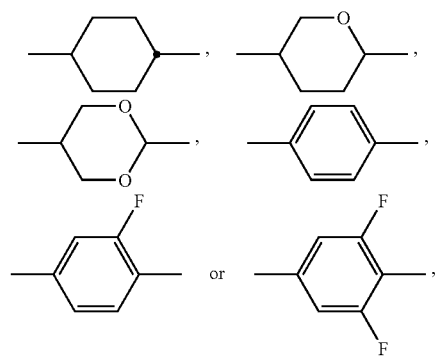

$L^{21}$, $L^{22}$, $L^{31}$ and $L^{32}$, are, independently of each other, H or F, preferably $L^{21}$ and/or $L^{31}$ is F,
$X^2$ and $X^3$ are, independently of each other, halogen, halogenated alkyl or alkoxy with 1 to 6 C-atoms or halogenated alkenyl or alkenyloxy with 2 to 6 C-atoms, preferably F, Cl, —$OCF_3$ or —$CF_3$, most preferably F, Cl or —$OCF_3$,
$Z^3$ is —$CH_2CH_2$—, —$CF_2CF_2$—, —COO—, trans- —CH═CH—, trans- —CF═CF—, —$CH_2O$— or a single bond, preferably —$CH_2CH_2$—, —COO—, trans- —CH═CH— or a single bond and most preferably —COO—, trans- —CH═CH—, trans- or a single bond, and
l, m, n and o are, independently of each other, 0 or 1 and
optionally, however preferably, a dielectrically neutral component, component C, comprising one or more dielectrically neutral compounds of formula IV

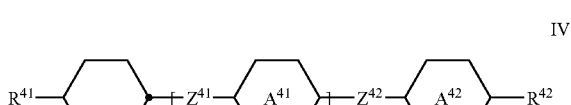

wherein
$R^{41}$, and $R^{42}$, independently of each other have the meaning given for $R^2$ under formula II above, preferably $R^{41}$ is alkyl and $R^{42}$ is alkoxy or both $R^{41}$ and $R^{42}$ are alkyl or $R^{41}$ is alkenyl and $R^{42}$ is alkyl,

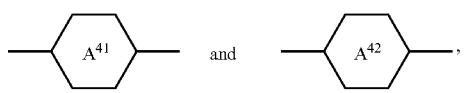

independently of each other, and in case

is present twice, also these, independently of each other, are

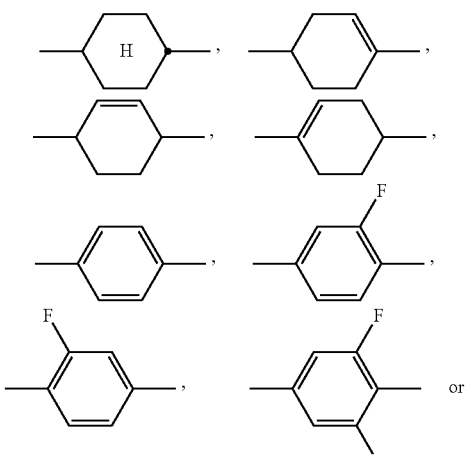

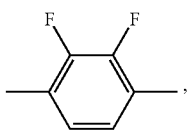

preferably at least one of

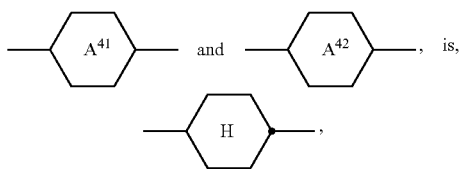

is, $Z^{41}$ and $Z^{42}$ are, independently of each other, and in case $Z^{41}$ is present twice, also these independently of each other, —CH$_2$CH$_2$—, —COO—, trans- —CH=CH—, trans- —CF=CF—, —CH$_2$O—, —CF$_2$O— or a single bond, preferably at least one of them is a single bond, and p is 0, 1 or 2, preferably 0 or 1.

The present invention also relates to compounds of formula I and its preferred subformulae.

Preferably, component A, comprises, consists essentially of, more preferably it predominantly contains, even more preferably it mainly contains, and most preferably it consists entirely of one or more dielectrically positive compounds of formula I, having a dielectric anisotropy of more than 3, which preferably are of formula I' and most preferably are selected from compounds of formulae I-1 to I-9, in particular from I-6, I-8 and I-9,

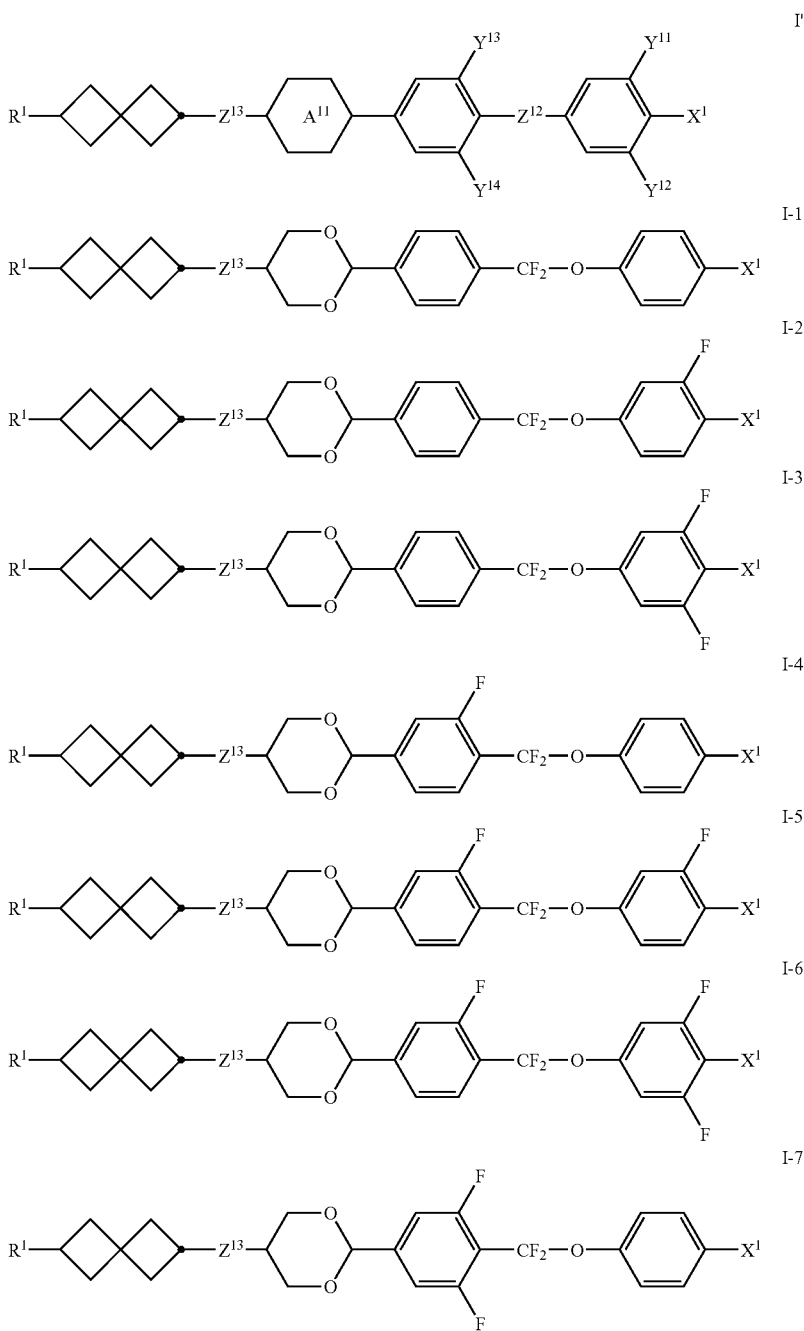

-continued

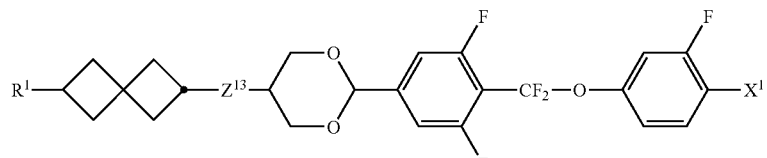

I-8

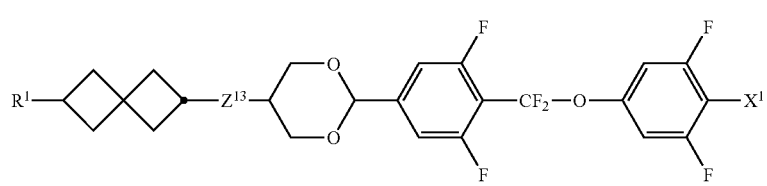

I-9 wherein the parameters have the respective meanings given under formula I above and the dioxane-2,5-diyl ring in formulae I-1 to I-9 optionaly may be replaced by a cyclohexane-1,4-diyl ring or by a tetrahydropyrane-2,5-diyl ring, and preferably $Z^{13}$ is a single bond and preferably $X^1$ is F.

Preferably the concentration of the component A in the medium is in the range from 1% to 70% by weight, more preferably from 2% to 40% by weight, even more preferably from 5% to 20% by weight and most preferably from 5% to 16% by weight.

Preferably the media according to the present invention comprise a second dielectrically dielectrically positive component, component B. Preferably this second dielectrically dielectrically positive component, component B, comprises, consists essentially of, more preferably it predominantly contains, even more preferably it mainly contains, and most preferably it consists entirely of dielectrically positive compounds having a dielectric anisotropy of more than 3.

Preferably this component, component B, comprises, consists essentially of, more preferably it predominantly contains, even more preferably it mainly contains, and most preferably it consists entirely of one or more dielectrically positive compounds having a dielectric anisotropy of more than 3, which are selected from compounds of formulae II and III.

In a preferred embodiment of the present invention component B, comprises, consists essentially of, more preferably it predominantly contains, even more preferably it mainly contains, and most preferably it consists entirely of one or more dielectrically positive compounds having a dielectric anisotropy of more than 3, which are selected from compounds of formulae II-1 and II-2

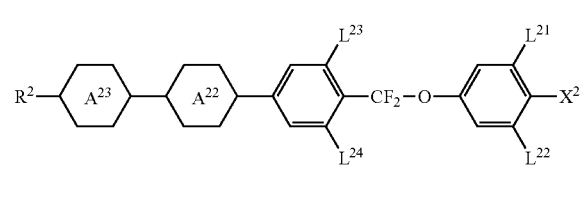

II-1

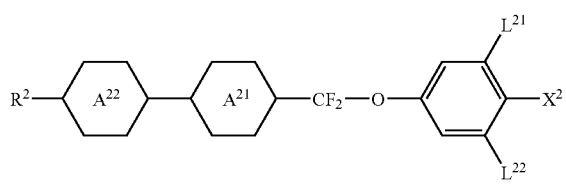

II-2 wherein the parameters have the respective meanings given under formula II above and in Formula II-1 and the parameters $L^{23}$ and $L^{24}$ are, independently of each other and of the other parameters, H or F.

Preferably component B comprises compounds selected from compounds of formulae II-1 and II-2, wherein $L^{21}$ and $L^{22}$ or $L^{31}$ and $L^{32}$ are both F In a preferred embodiment component B comprises compounds selected from compounds of formulae II-1 and II-2, wherein $L^{21}$, $L^{22}$, $L^{31}$ and $L^{32}$ all are F.

Preferably component B comprises one or more compounds of formula II-1. Preferably the compounds of formula II-1 are selected from compounds of formulae II-1a to II-1e

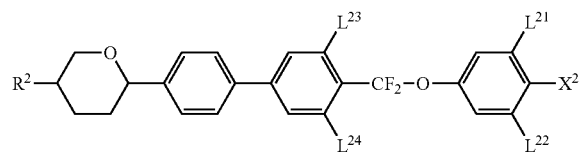

II-1a

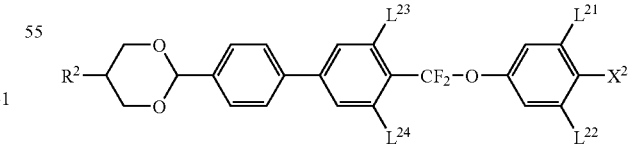

II-1b

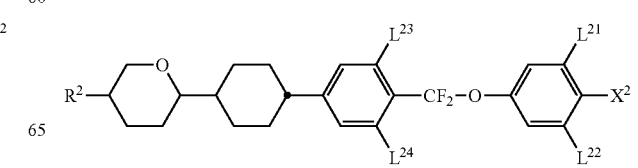

II-1c

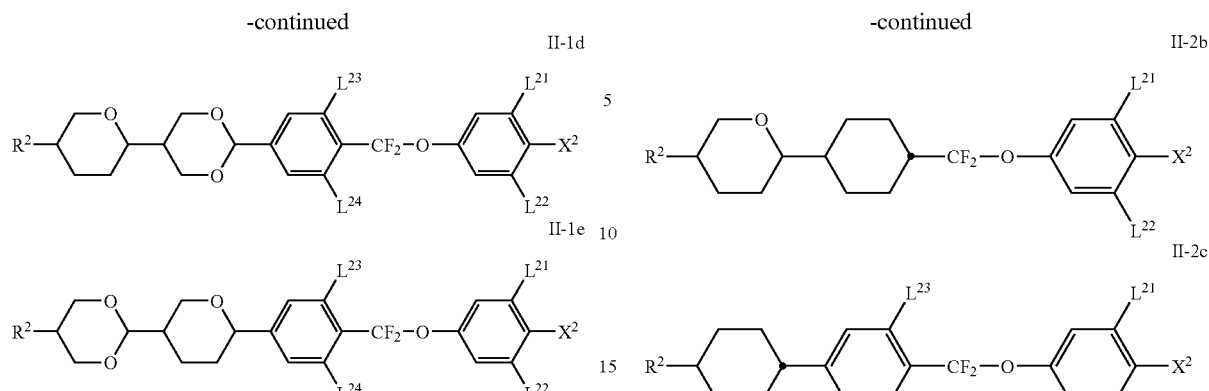

wherein the parameters have the respective meanings given above and $L^{23}$ and $L^{24}$ are, independently of each other and the other parameters, H or F.

Preferably component B comprises compounds selected from compounds of formulae II-1a to II-1e, wherein $L^{21}$ and $L^{22}$ or $L^{23}$ and $L^{24}$ are both F In a preferred embodiment component B comprises compounds selected from compounds of formulae II-1a to II-1e, wherein $L^{21}$, $L^{22}$, $L^{23}$ and $L^{24}$ all are F.

Especially preferred compounds of formula II-1 are

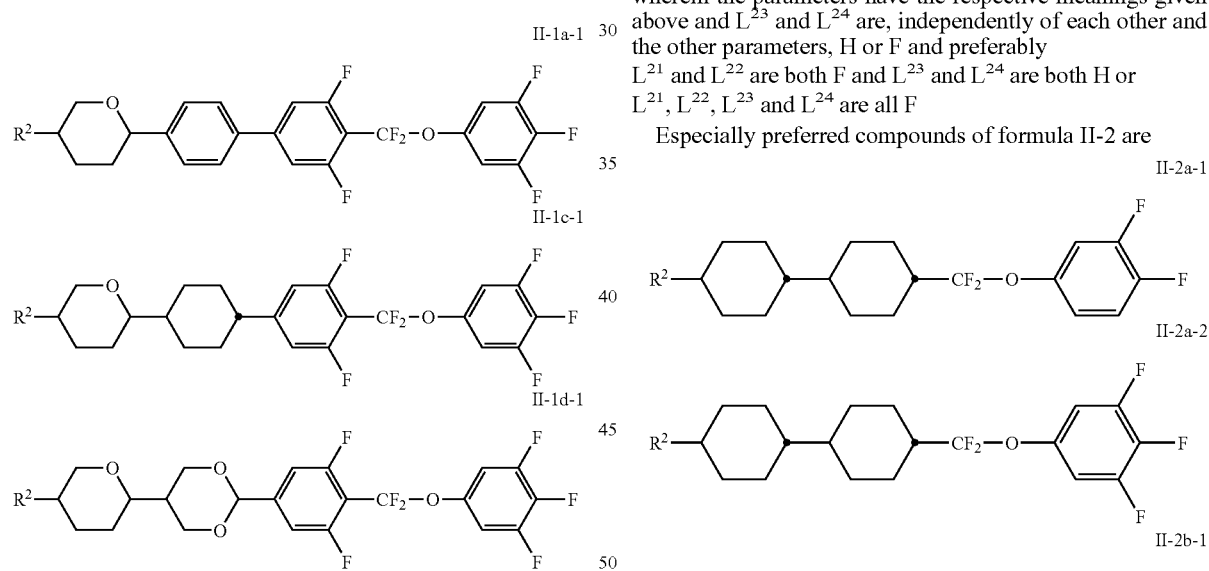

wherein $R^2$ has the meaning given above.

Preferably Component B comprises one or more compounds of formula II-2. Preferably the compound of formula II-2 are selected from compounds of formulae II-2a to II-2d wherein the parameters have the respective meanings given above and $L^{23}$ and $L^{24}$ are, independently of each other and the other parameters, H or F and preferably
$L^{21}$ and $L^{22}$ are both F and $L^{23}$ and $L^{24}$ are both H or
$L^{21}$, $L^{22}$, $L^{23}$ and $L^{24}$ are all F Especially preferred compounds of formula II-2 are

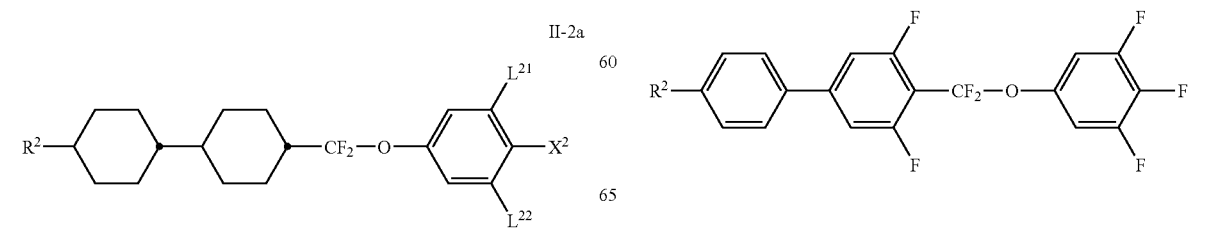

wherein $R^2$ has the meaning given above.

In a further preferred embodiment of the present invention component B, comprises, consists essentially of, more preferably it predominantly contains, even more preferably it mainly contains, and most preferably it consists entirely of one or more dielectrically positive compounds having a dielectric anisotropy of more than 3, selected from compounds of formulae III-1 and III-2

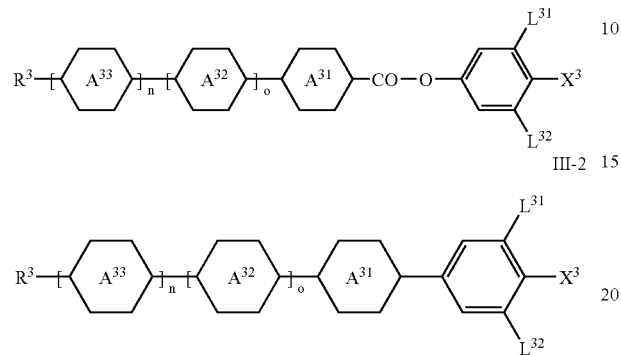

III-1

III-2 wherein the parameters have the respective meanings given under formula III above.

Preferably component B comprises one or more compounds of formula III-1. Preferably the compounds of formula III-1 are selected from compounds of formulae III-1a and III-1b

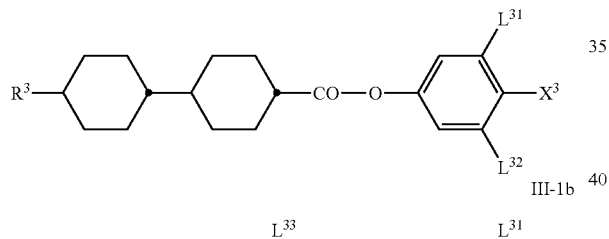

III-1a

III-1b wherein the parameters have the respective meanings given above and the parameters $L^{33}$ and $L^{34}$ are, independently of each other and of the other parameters, H or F.

Preferably component B comprises one or more compounds of formula III-2. Preferably the compounds of formula III-2 are selected from compounds of formulae III-2a to III-2g

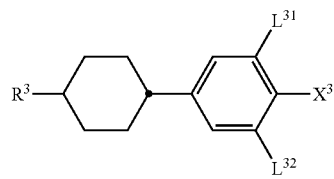

III-2a

-continued

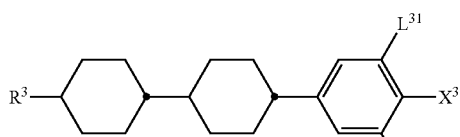

III-2b

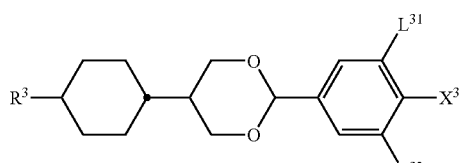

III-2c

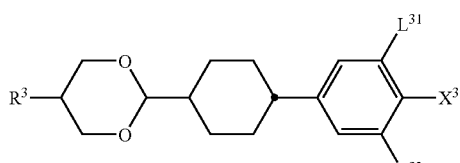

III-2d

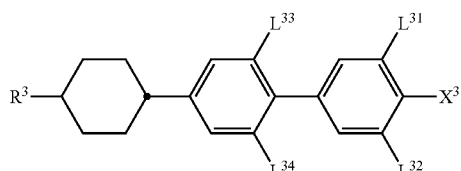

III-2e

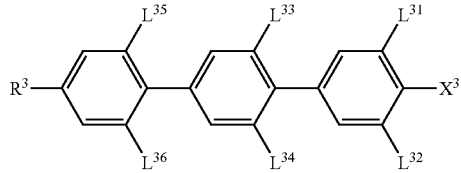

III-2f

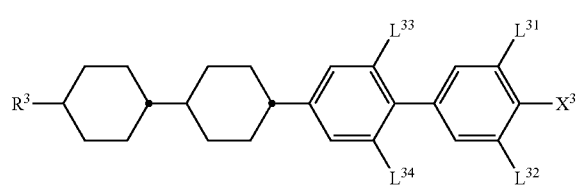

III-2g wherein the parameters have the respective meanings given above and $L^{32}$ to $L^{36}$ are, independently of each other and of the other parameters, L or H.

Preferably component B comprises one or more compounds of formula III-1a, which preferably are selected from compounds of formulae III-1a-1 to III-1a-6

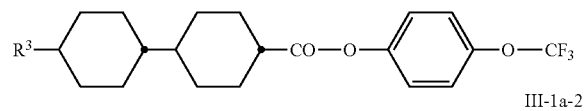

III-1a-1

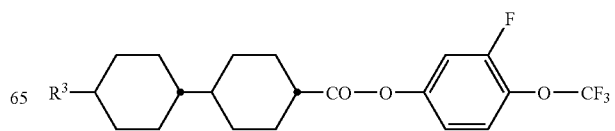

III-1a-2

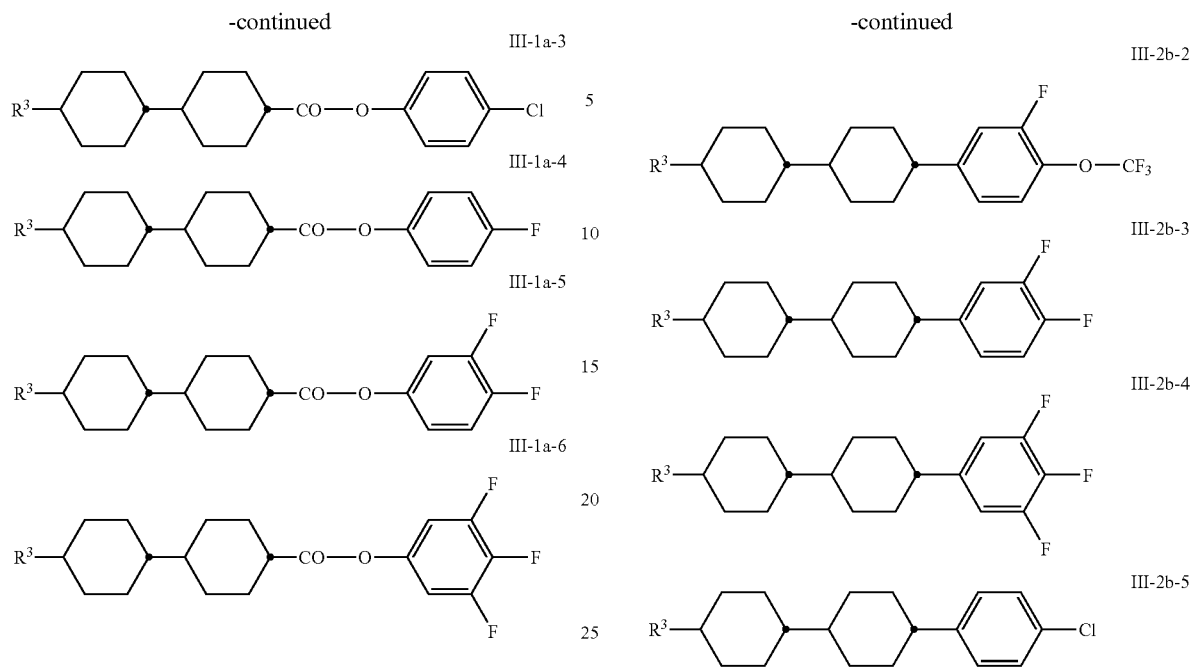

wherein R³ has the meaning given above.

Preferably component B comprises one or more compounds of formula II-2a, which are preferably selected from compounds of formulae III-2a-1 to III-2a-4

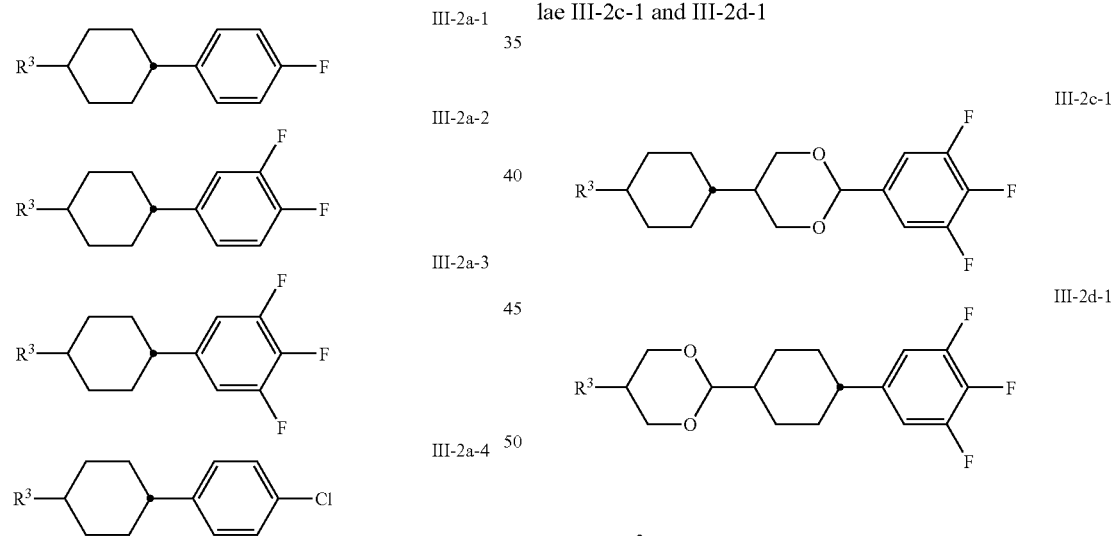

wherein R³ has the meaning given above.

Preferably component B comprises one or more compounds of formula II-2b, which are preferably selected from compounds of formulae III-2b-1 to III-2b-5

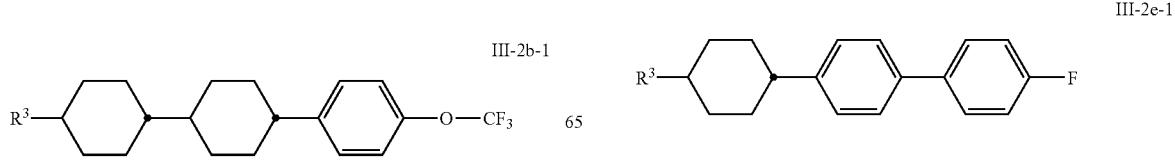

wherein R³ has the meaning given above.

Preferably component B comprises one or more compounds selected from compounds of formulae III-2c and III-2d, which are preferably selected from compounds of formulae III-2c-1 and III-2d-1 wherein R³ has the meaning given above.

Preferably component B comprises one or more compounds of formula III-2e, which are preferably selected from compounds of formulae III-2e-1 to III-2e-5

-continued

III-2e-2
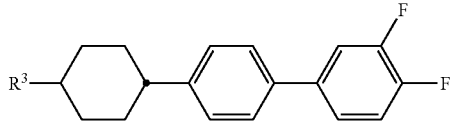

III-2e-3
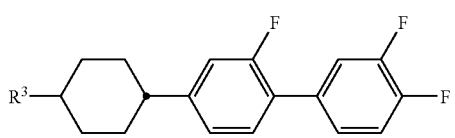

III-2e-4
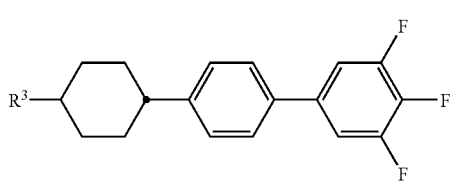

III-2e-5
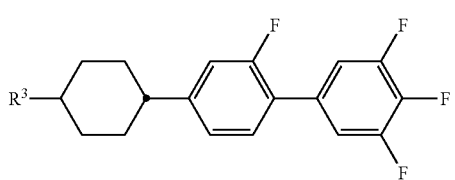

wherein R³ has the meaning given above.

Preferably component B comprises one or more compounds of formula III-2f, which are preferably selected from compounds of formulae III-2f-1 to III-2f-5

III-2f-1
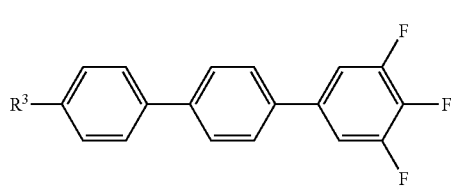

III-2f-2
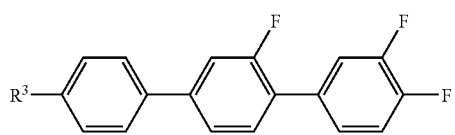

III-2f-3
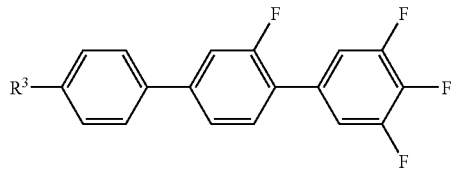

III-2f-4
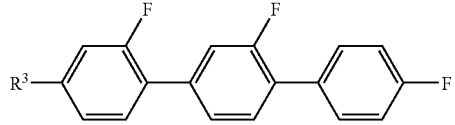

III-2f-5
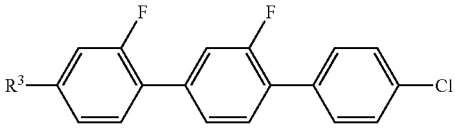

wherein R³ has the meaning given above.

Preferably component B comprises one or more compounds of formula III-2g, which are preferably selected from compounds of formulae III-2g-1 to III-2g-3

III-2g-1
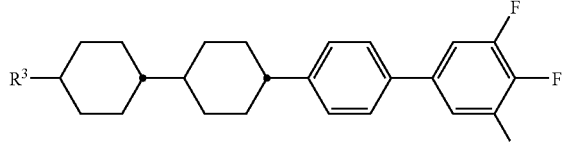

III-2g-2
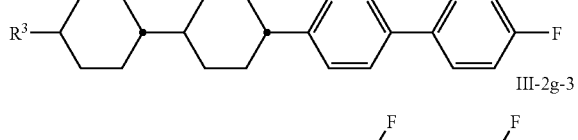

III-2g-3
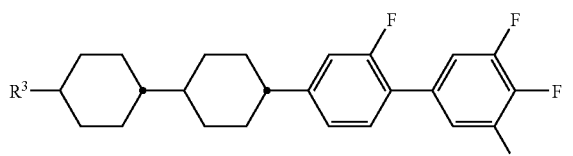

wherein R³ has the meaning given above.

Alternatively or additionally to compounds of formulae III-1 and/or III-2 the media according to the present invention may comprise one or more compounds of formula III-3

III-3
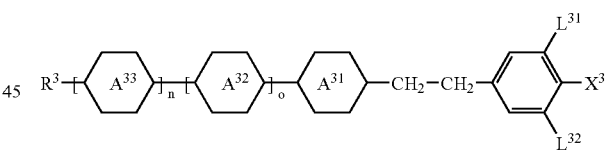

wherein the parameters have the respective meanings given under formula III above, and preferably of formula III-3a III-3a
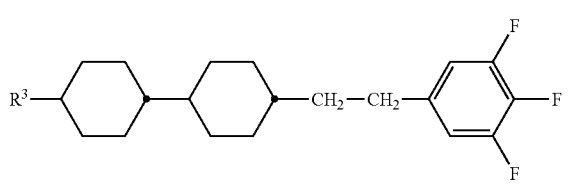

wherein R³ has the meaning given above.

Preferably the liquid crystalline media according to the present invention comprise a dielectrically neutral component, component C. This component has a dielectric anisotropy in the range from −1.5 to 3. Preferably it comprises, consists essentially of, more preferably predominantly contains, preferably it mainly contains, and especially preferably consists entirely of dielectrically neutral compounds, having a dielectric anisotropy in the range from −1.5 to 3. Preferably this component comprises or consist essentially of one or more, more preferably predominantly contains, more preferably it mainly contains, and especially preferably consists entirely of dielectrically neutral compounds, having a dielectric anisotropy in the range from −1.5 to 3, of formula IV.

Preferably the dielectrically neutral component, component C, comprises one or more compounds selected from compounds of formulae IV-1 to IV-5

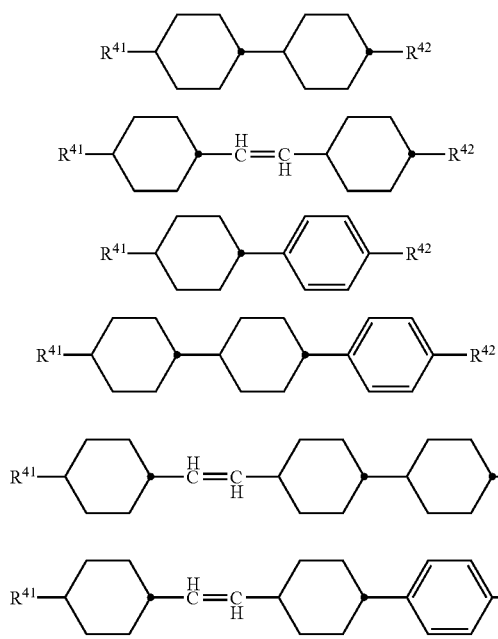

wherein $R^{41}$ and $R^{42}$ have the respective meanings given under formula IV above and in formulae IV-1, IV-4, IV-5 and IV-6. $R^{41}$ preferably is alkyl or alkenyl, preferably alkenyl and $R^{42}$ preferably is alkyl or alkenyl, preferably alkyl, in formula IV-2 $R^{41}$ and $R^{42}$ preferably are alkyl and in formula IV-3 $R^{41}$ preferably is alkyl or alkenyl, preferably alkyl and $R^{42}$ preferably is alkyl or alkoxy, preferably alkoxy.

Preferably the dielectrically neutral component, component C, comprises one or more compounds selected from compounds of formulae IV-1, IV-3, IV-4 and IV-5, preferably one or more compounds of formula IV-1 and one or more compounds selected from formulae IV-3 and IV-4, preferably one or more compounds each of formulae IV-1, IV-3 and IV-4 and most preferably one or more compounds each of formulae IV-1, IV-3, IV-4 and IV-5.

In a further preferred embodiment of the present invention, which may the same as the previous one or a different one, the liquid crystal mixtures according to the present invention comprise component C, comprising, consisting essentially of, preferably predominantly containing, more preferably it mainly contains, and most preferably entirely consisting of compounds of formula IV selected from compounds of formulae IV-1 to IV-5, as shown above, and optionally of formulae IV-6 to IV-13

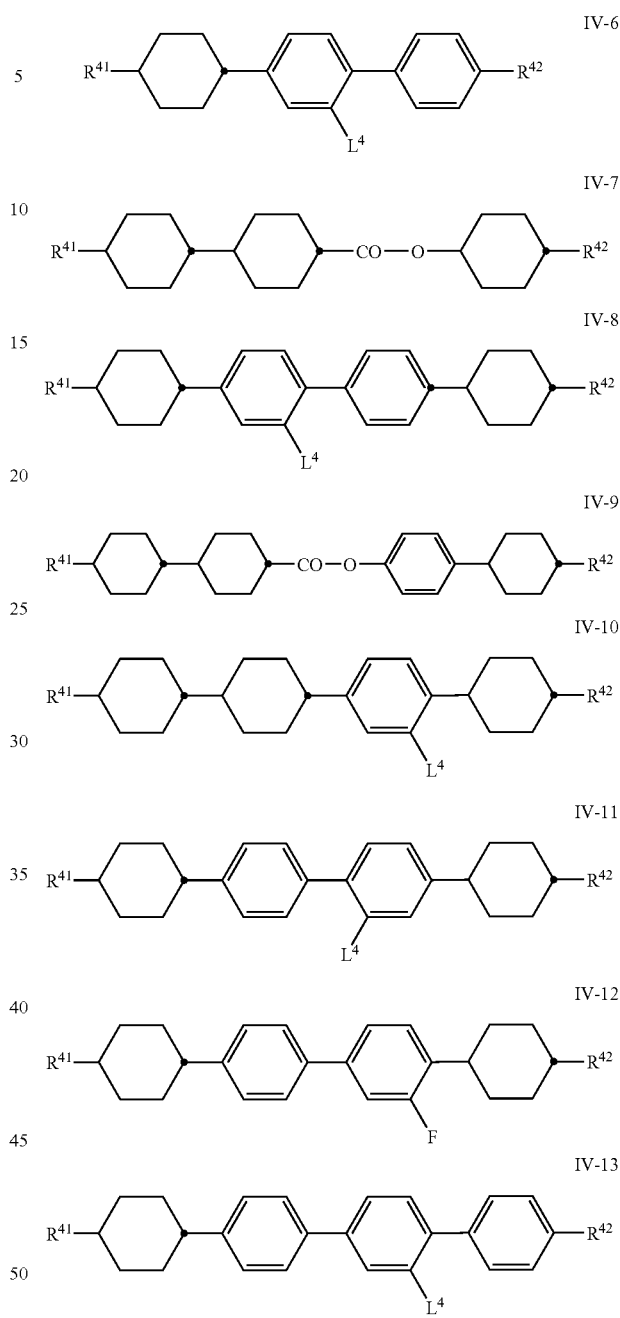

wherein
$R^{41}$ and $R^{42}$ are, independently of each other, alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms and
$L^4$ is H or F.

Alternatively or additionally to compounds of formulae II and/or III the media according to the present invention may comprise one or more dielectrically positive compounds of formula V

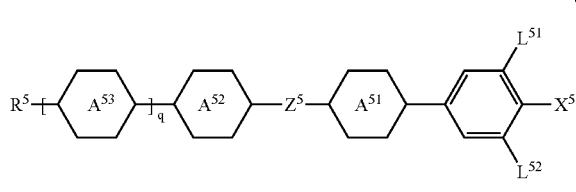

V wherein
R⁵ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and R¹ preferably is alkyl or alkenyl,

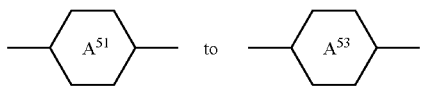

are, independently of each other,

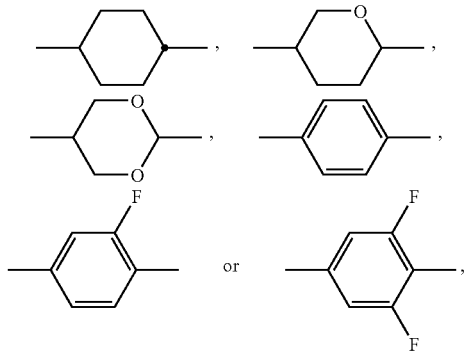

$L^{51}$ and $L^{52}$, are, independently of each other, H or F, preferably $L^{51}$ is F and $X^5$ is halogen, halogenated alkyl or alkoxy with 1 to 3 C-atoms or halogenated alkenyl or alkenyloxy wit 2 or 3 C-atoms, preferably F, Cl, —OCF₃ or —CF₃, most preferably F, Cl or —OCF₃, $Z^5$ is —CH₂CH₂—, —CF₂CF₂—, —COO—, trans- —CH=CH—, trans- —CF=CF— or —CH₂O, preferably —CH₂CH₂—, —COO— or trans- —CH=CH— and most preferably —COO— or —CH₂CH₂—, and q is 0 or 1.

Preferably the media according to the present invention comprises one or more compounds of formula V, preferably selected from compounds of formulae V-1 and V-2

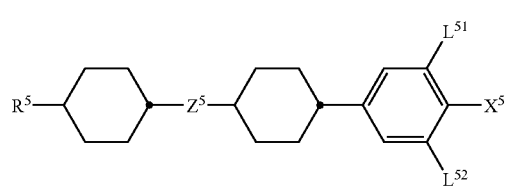

V-1

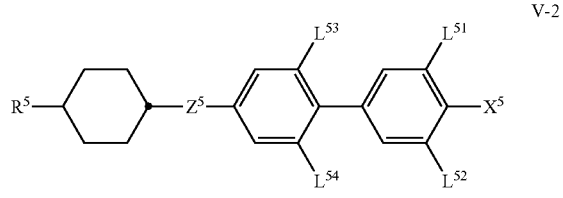

V-2 wherein the parameters have the respective meanings given above and the parameters $L^{53}$ and $L^{54}$ are, independently of each other and of the other parameters, H or F and preferably $Z^5$ is —CH₂—CH₂—.

Preferably the compounds of formula V-1 are selected from compounds of formulae V-1a and V-1b

V-1a

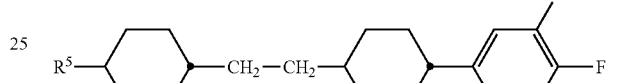

V-1b wherein the R⁵ has the meaning given above.

Preferably the compounds of formula V-2 are selected from compounds of formulae V-2a to V-2d

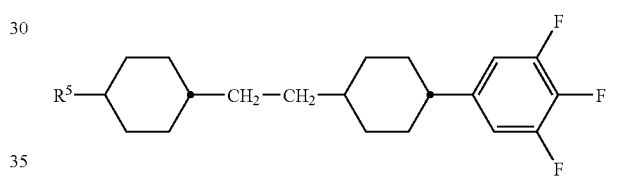

V-2a

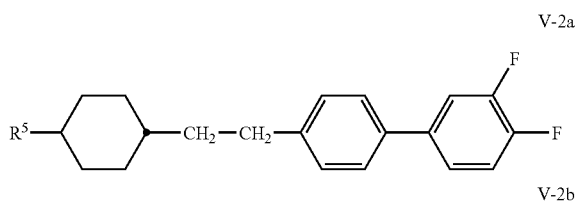

V-2b

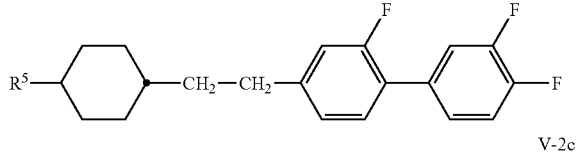

V-2c

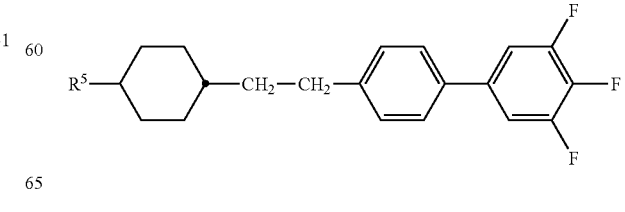

V-2d

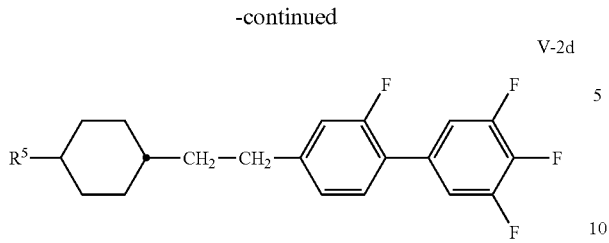

wherein the $R^5$ has the meaning given above.

Preferably the liquid crystalline media according to the present invention comprise an additional dielectrically neutral component, component D. This component has a dielectric anisotropy in the range from −1.5 to 3. Preferably it comprises, consists essentially of, preferably predominantly contains, preferably it mainly contains, and especially preferably consists entirely of dielectrically neutral compounds, having a dielectric anisotropy in the range from −1.5 to 3. Preferably this component comprises or consists essentially of one or more, more preferably predominantly contains, more preferably it mainly contains, and especially preferably consists entirely of dielectrically neutral compounds, having a dielectric anisotropy in the range from −1.5 to 3, of formula VI

VI

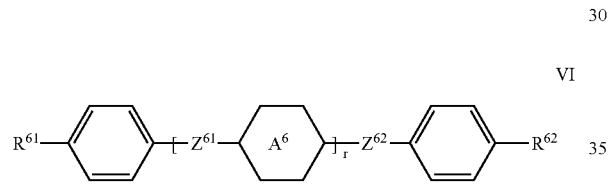

wherein $R^{61}$, and $R^{62}$, independently of each other have the meaning given for $R^2$ under formula II above, preferably $R^{61}$ is alkyl and $R^{62}$ is alkyl or alkenyl,

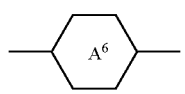

and in case it is occurring twice in each occurrence independently of each other, is

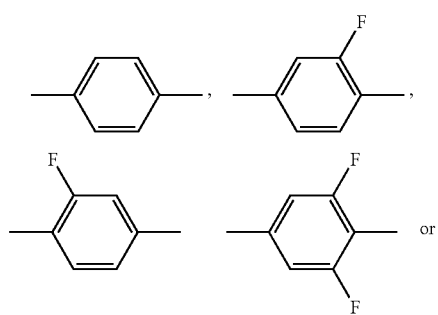

preferably at least one of

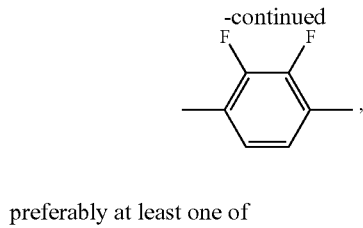

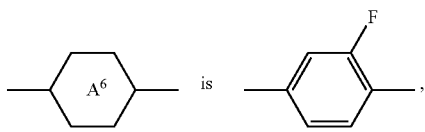

$Z^{61}$ and $Z^{62}$ are, independently of each other, and in case $Z^{61}$ is present twice, also these independently of each other, —$CH_2CH_2$—, —COO—, trans- —CH=CH—, trans- —CF=CF—, —$CH_2O$—, —$CF_2O$— or a single bond, preferably at least one of them is a single bond, and r is 0, 1 or 2, preferably 0 or 1.

Preferably the dielectrically neutral component, component D, comprises one or more compounds selected from compounds of formulae VI-1 and VI-2

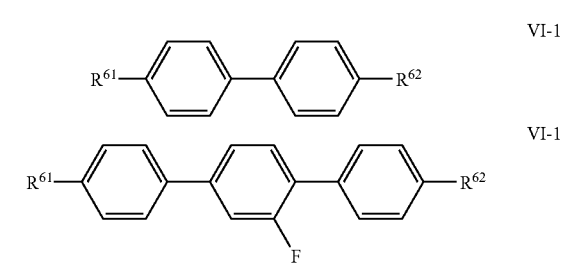

wherein $R^{61}$ and $R^{62}$ have the respective meanings given under formula VI above and $R^{61}$ preferably is alkyl and in formula VI-1 $R^{62}$ preferably is alkenyl, preferably —$(CH_2)_2$—CH=CH—$CH_3$ and in formula VI-2 $R^{62}$ preferably is alkyl.

Preferably the dielectrically neutral component, component D, comprises one or more compounds selected from compounds of formulae VI-1 and VI-2 wherein preferably $R^{61}$ is n-alkyl and in formula VI-1 $R^{62}$ preferably is alkenyl and in formula VI-2 $R^{62}$ preferably is n-alkyl.

Preferably the liquid crystal mixtures according to the present invention do contain at least one further component besides components A and B. This third component may be either one of components C and D, preferably the third component present is component C.

Obviously the mixtures according to the present invention also can contain all four components A, B, C and D.

Additionally the liquid crystal mixtures according to the present invention may comprise a further optional component, component E, which has a negative dielectric anisotropy and comprises, consists essentially of, preferably predominantly contains, more preferably it mainly contains, and most preferably entirely consists of dielectrically negative compounds preferably of formula VII

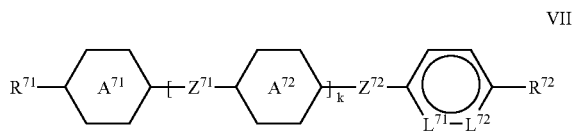

wherein
$R^{71}$ and $R^{72}$ independently of each other have the meaning given for $R^2$ under formula II above,

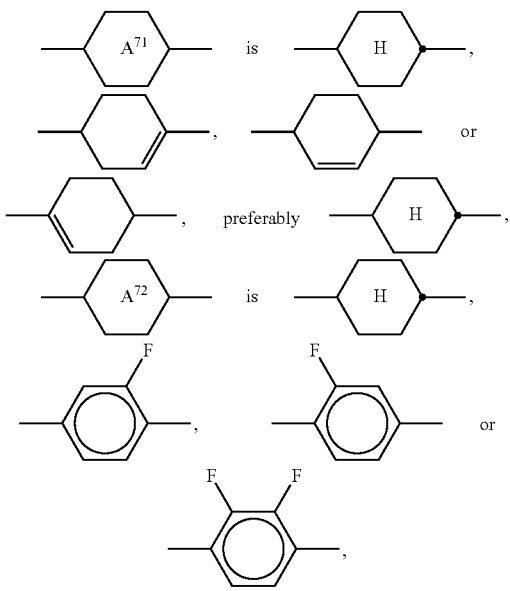

$Z^{71}$ and $Z^{72}$ are, independently of each other, —CH$_2$CH$_2$—, —COO—, trans- CH=CH—, trans- —CF=CF—, —CH$_2$O—, —CF$_2$O— or a single bond, preferably at least one of them is a single bond and most preferably both are a single bond, $L^{71}$ and $L^{72}$ are, independently of each other, C—F or N, preferably at least one of them is C—F and most preferably both of them are C—F and k is 0 or 1.

Preferably the liquid crystalline media according to the instant invention comprise, consists essentially of, more preferably predominantly contains, more preferably mainly contains, and most preferably entirely consist of components A to E, preferably A to D and most preferably A to C, and in particular of compounds selected from compounds of formulae I to VII, preferably I to V and most preferably I to III.

Comprising in this application means in the context of compositions that the entity referred to, e.g. the medium or the component, contains the component or components or of the compound or compounds in question, preferably in a total concentration of 10% or more and most preferably of 20% or more.

Predominantly containing, in this context, means that the entity referred to contains 55% or more, preferably 60% or more and most preferably 70% or more of the component or components or of the compound or compounds in question.

Mainly containing, in this context, means that the entity referred to contains 80% or more, preferably 90% or more and most preferably 95% or more of the component or components or of the compound or compounds in question.

Entirely consisting of, in this context, means that the entity referred to contains 98% or more, preferably 99% or more and most preferably 100.0% of the component or components or of the compound or compounds in question.

Component E preferably comprises, consists essentially of, preferably predominantly contains, more preferably it mainly contains, and most preferably entirely consists of one or more compounds of formula VII, preferably selected from compounds of formulae VII-1 to VII-3

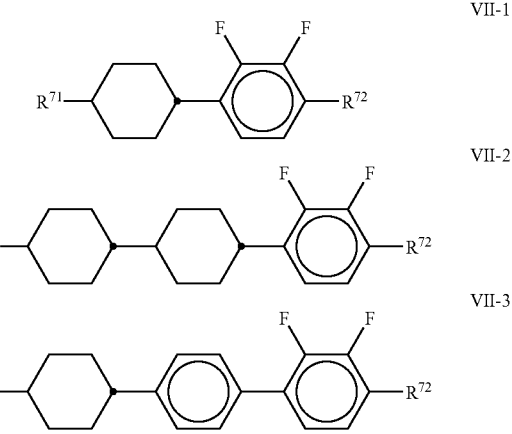

wherein
$R^{71}$ and $R^{72}$ have the respective meanings given under formula VI above.

In formulae VII-1 to VII-3 $R^{71}$ preferably is n-alkyl or 1-E-alkenyl and $R^{72}$ preferably is n-alkyl or alkoxy.

Also other mesogenic compounds, which are not explicitly mentioned above, can optionally and beneficially be used in the media according to the instant invention. Such compounds are known in the field.

The liquid crystal media according to the instant invention are characterized by a clearing point of 70° C. or more, preferably of 75° C. or more and in particular of 80° C. or more.

The Δn, at 589 nm (Na$^D$) and 20° C., of the liquid crystal media according to the instant invention preferably is in the range of 0.060 or more to 0.135 or less, more preferably in the range of 0.070 or more to 0.125 or less and most preferably in the range of 0.080 or more to 0.120 or less. Particularly preferred are media with Δn of 0.11 or less and preferrably of 0.10 or less.

The Δε, at 1 kHz and 20° C., of the liquid crystal medium according to the invention preferably is 4.0 or more, more preferably 6.0 or more and most preferably 6.0 or more. In particular Δε is 10.0 or more, preferably 11.0 or more.

Preferably the nematic phase of the inventive media extends at least from 0° C. or less to 70° C. more, more preferably at least from –20° C. or less to 70° C. more, most preferably at least from –30° C. or less to 75° C. more and in particular at least from –40° C. or less to 75° C. more.

In a first preferred embodiment of the present invention the Δn of the liquid crystal media is n the range of 0.090 or more to 0.125 or less, more preferably in the range of 0.095 or more to 0.120 or less and most preferably in the range of 0.100 or more to 0.115 or less, whereas Δε preferably is in the range from 4.0 or more to 7.0 or less.

In a second preferred embodiment of the present invention the Δn of the liquid crystal media is n the range of 0.085 or more to 0.130 or less, more preferably in the range of 0.090 or more to 0.125 or less and most preferably in the range of 0.095 or more to 0.120 or less, whereas $\Delta\epsilon$ preferably is 6.0 or more, more preferably 7.0 or more, even more preferably 8.0 or more and most preferably in the range from 8.0 or more to 10.0 or less.

In this embodiment preferably the nematic phase of the inventive media extends at least from $-20°$ C. or less to $70°$ C. more, more preferably at least from $-20°$ C. or less to $70°$ C. more, most preferably at least from $-30°$ C. or less to $70°$ C. more and in particular at least from $-40°$ C. or less to $70°$ C. more.

In a third preferred embodiment of the present invention the $\Delta n$ of the liquid crystal media is n the range of 0.070 or more to 0.120 or less, more preferably in the range of 0.075 or more to 0.115 or less and most preferably in the range of 0.080 or more to 0.110 or less, whereas $\Delta\epsilon$ preferably is 4.0 or more, more preferably is in the range from 4.0 or more to 14.0 or less and most preferably either in the range from 4.0 or more to 6.0 or less or, particularly preferred in the range from 6.0 or more to 11.0 or less.

In this embodiment preferably the nematic phase of the inventive media extends at least from $-20°$ C. or less to $75°$ C. more, more preferably at least from $-30°$ C. or less to $70°$ C. more, most preferably at least from $-30°$ C. or less to $75°$ C. more and in particular at least from $-30°$ C. or less to $80°$ C. more.

Component A preferably is used in a concentration from 1% to 65%, more preferably from 2% to 60%, more preferably from 3% to 50%, and most preferably from 5% to 40% of the total mixture.

Component B preferably is used in a concentration from 10% to 60%, more preferably from 15% to 55%, more preferably from 20% to 50% and most preferably from 20% to 45% of the total mixture.

Component C preferably is used in a concentration from 0% to 70%, more preferably from 10% to 60%, more preferably from 20% to 50% and most preferably from 15% to 40% of the total mixture.

Component D preferably is used in a concentration from 0% to 50%, preferably from 1% to 40%, more preferably from 5% to 30% and most preferably from 10% to 20% of the total mixture.

Component E preferably is used in a concentration from 0% to 30%, preferably from 0% to 15% and most preferably from 1% to 10% of the total mixture.

Optionally, the inventive media can comprise further liquid crystal compounds in order to adjust the physical properties. Such compounds are known in the art. Their concentration in the media according to the instant invention is preferably 0% to 30%, more preferably 0% to 20% and most preferably 1% to 15%.

In the first preferred embodiment of the present invention mentioned above component A preferably is used in a concentration from 40% to 65%, more preferably from 45% to 60% and most preferably from 50% to 57% of the total mixture, whereas component D preferably is used in a concentration from 5% to 40%, preferably from 10% to 35% and most preferably from 15% to 30% of the total mixture.

In this preferred embodiment the media preferably comprise one or more compounds of formula VI and most preferably of formula VI-2.

Especially in the second preferred embodiment of the present invention mentioned above component C preferably comprises one or more compounds of formula IV, more preferably of formula IV-1, more preferably of formula CC-n-V and/or CC-n-Vm, more preferably of formula CC-n-V1 and/or CC-n-V and most preferably selected from compound of formulae CC-3-V, CC-4-V CC-5-V and CC-3-V1.

Preferably the liquid crystal media contain 50% to 100%, more preferably 70% to 100% and most preferably 80% to 100% and in particular 90% to 100% totally of components A, B, C and D, preferably of components A, B and C, which, in turn, contain, consist essentially of, preferably predominantly contains, more preferably mainly contains, and most preferably entirely consist of one or more of compounds of formulae I, II, III, IV, V, VI and VII, preferably of formulae I, II, III, IV, V and VI, respectively.

In the present application the term dielectrically positive means compounds or components with $\Delta\epsilon>3.0$, dielectrically neutral with $-1,5\leq\Delta\epsilon\leq3.0$ and dielectrically negative with $\Delta\epsilon<-1,5$. $\Delta\epsilon$ is determined at a frequency of 1 kHz and at $20°$ C. The dielectric anisotropy of the respective compound is determined from the results of a solution of 10% of the respective individual compound in a nematic host mixture. In case the solubility of the respective compound in the host mixture is less than 10% the concentration is reduced to 5%. The capacities of the test mixtures are determined both in a cell with homeotropic and with homogeneous alignment. The cell gap of both types of cells is approximately 20 µm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The mixture ZLI-4792 is a dielectrically positive mixture consisting essentially only of dielectrically positive, terminally fluorinated compounds, whereas the mixture ZLI-3086 is a dielectrically neutral mixture and consists essentially only of dielectrically neutral compounds. ZLI-4792 has a clearing point of $92.5°$ C., a $\Delta n$ of 0.097, and a $\Delta\epsilon$ of 5.3 (the latter two at $20°$ C. and at 589 Nm, respectively at 1.0 kHz), whereas ZLI-3086 has a clearing point of $79°$ C., a $\Delta n$ of 0.113, and a $\Delta\epsilon$ of about 0.1. The dielectric permittivities of the compounds are determined from the change of the respective values of the host mixture upon addition of the compounds of interest. The values are extrapolated to a concentration of the compounds of interest of 100%. Components having a nematic phase at the measurement temperature of $20°$ C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$), also called Freedericksz-threshold ($V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of $20°$ C., unless explicitly stated otherwise. The optical anisotropy ($\Delta n$) is determined at a wavelength of 589.3 nm. The dielectric anisotropy ($\Delta\epsilon$) is determined at a frequency of 1 kHz. The threshold voltages, as well as all other electro-optical properties have been determined with test cells prepared at Merck KGaA, Germany. The test cells for the determination of Δε had a cell gap of approximately 20 μm. The electrode was a circular ITO electrode with an area of 1.13 cm² and a guard ring. The orientation layers were lecithin for homeotropic orientation ($\epsilon_\parallel$) and polyimide AL-1054 from Japan Synthetic Rubber for homogeneuous orientation ($\epsilon_\perp$). The capacities were determined with a frequency response analyser Solatron 1260 using a sine wave with a voltage of 0.3 $V_{rms}$. The light used in the electro-optical measurements was white light. The set up used was commercially available equipment of Otsuka, Japan. The characteristic voltages have been determined under perpendicular observation. The threshold ($V_{10}$) - mid grey ($V_{50}$) - and saturation ($V_{90}$) voltages have been determined for 10%, 50% and 90% relative contrast, respectively.

The liquid crystal media according to the present invention can contain further additives and chiral dopants in usual concentrations. The total concentration of these further constituents is in the range of 0% to 10% preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 4 to 20 and most preferably of 4 to 16 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-AMD, VAN-AMD, IPS and OCB LCDs and in particular in composite systems, like PDLC, NCAP, PN LCDs and especially in ASM-PA LCDs.

The melting point T(C,N), the transition from the smectic (S) to the nematic (N) phase T(S,N) and the clearing point T(N,I) of the liquid crystals are given in degrees centigrade.

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$ and $C_mH_{2m+1}$ are straight chain alkyl groups with n respectively m C-atoms. The interpretation of table B is self-evident. Table A does only list the abbreviations for the cores of the structures. The individual compounds are denoted by the abbreviation of the core followed by a hyphen and a code specifying the substituents $R^1$, $R^2$, $L^1$ and $L^2$ follows:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN•F | $C_nH_{2n+1}$ | CN | H | F |
| nN•F•F | $C_nH_{2n+1}$ | CN | F | F |
| nF | $C_nH_{2n+1}$ | F | H | H |
| nF•F | $C_nH_{2n+1}$ | F | H | F |
| nF•F•F | $C_nH_{2n+1}$ | F | F | F |
| nOF | $OC_nH_{2n+1}$ | F | H | H |
| nCl | $C_nH_{2n+1}$ | Cl | H | H |
| nCl•F | $C_nH_{2n+1}$ | Cl | H | F |
| nCl•F•F | $C_nH_{2n+1}$ | Cl | F | F |
| $nCF_3$ | $C_nH_{2n+1}$ | $CF_3$ | H | H |
| $nCF_3$•F | $C_nH_{2n+1}$ | $CF_3$ | H | F |
| $nCF_3$•F•F | $C_nH_{2n+1}$ | $CF_3$ | F | F |
| $nOCF_3$ | $C_nH_{2n+1}$ | $OCF_3$ | H | H |
| $nOCF_3$•F | $C_nH_{2n+1}$ | $OCF_3$ | H | F |
| $nOCF_3$•F•F | $C_nH_{2n+1}$ | $OCF_3$ | F | F |
| $nOCF_2$ | $C_nH_{2n+1}$ | $OCHF_2$ | H | H |
| $nOCF_2$•F | $C_nH_{2n+1}$ | $OCHF_2$ | H | F |
| $nOCF_2$•F•F | $C_nH_{2n+1}$ | $OCHF_2$ | F | F |
| nS | $C_nH_{2n+1}$ | NCS | H | H |
| nS•F | $C_nH_{2n+1}$ | NCS | H | F |
| nS•F•F | $C_nH_{2n+1}$ | NCS | F | F |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |

TABLE A

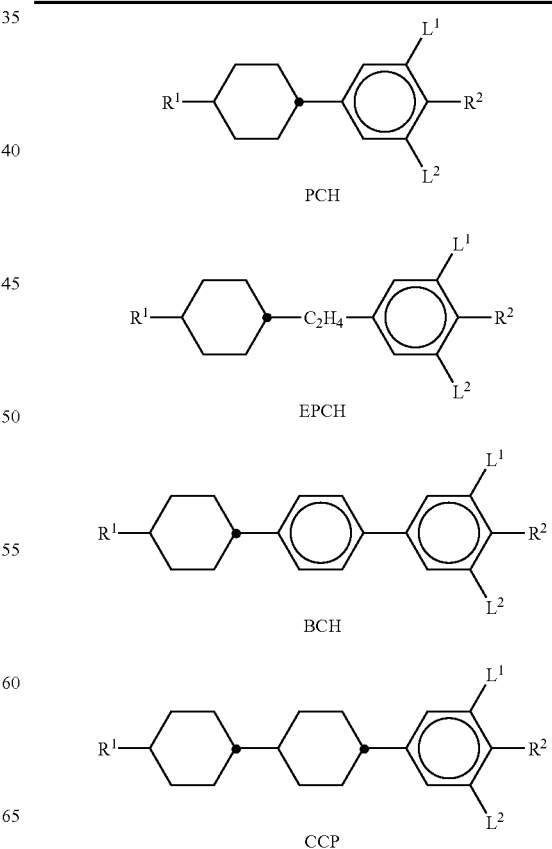

PCH

EPCH

BCH

CCP

TABLE A-continued
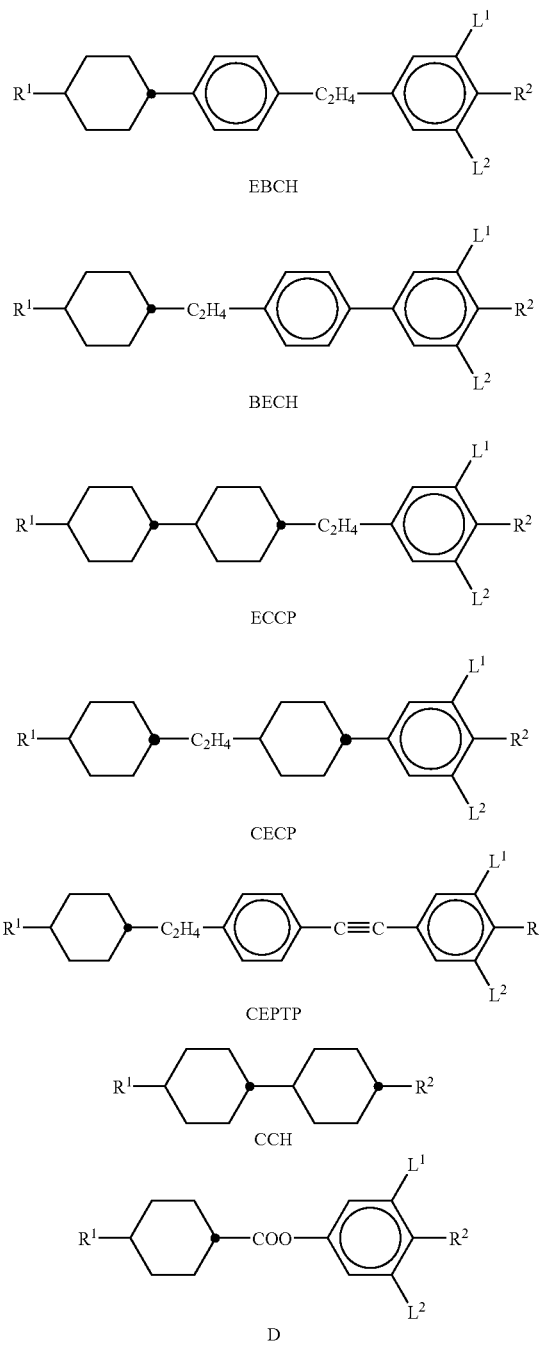
TABLE A-continued
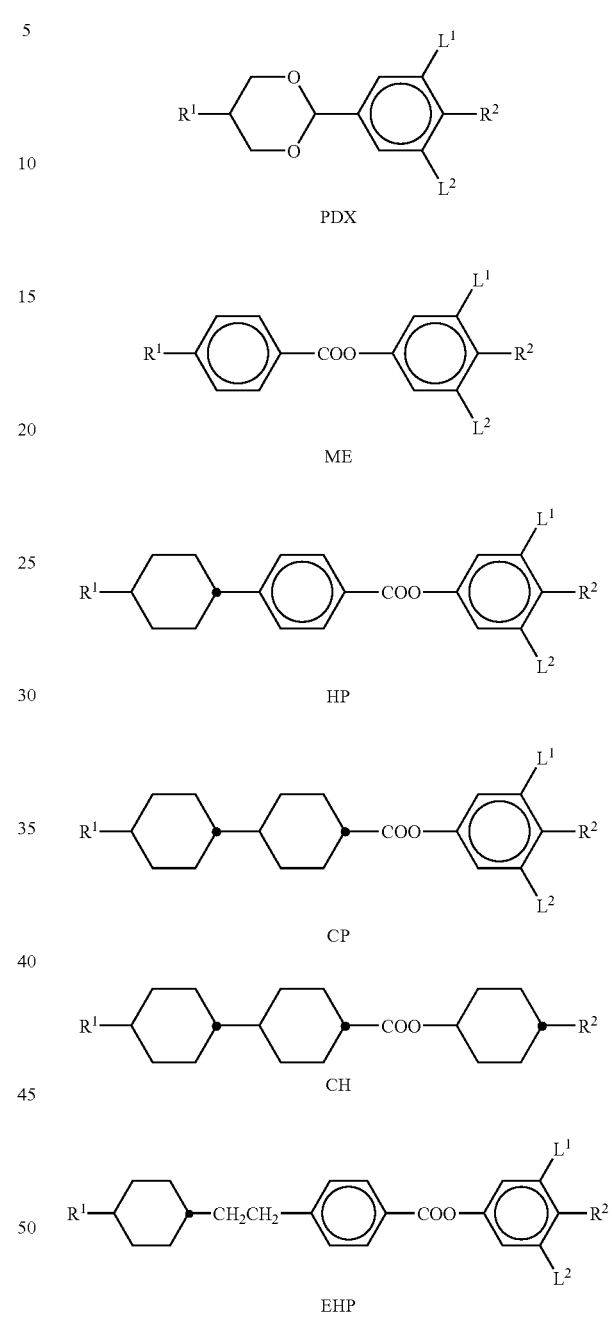
TABLE B
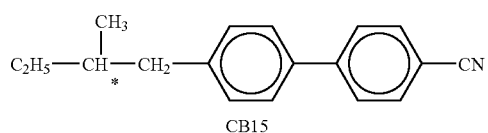

TABLE B-continued
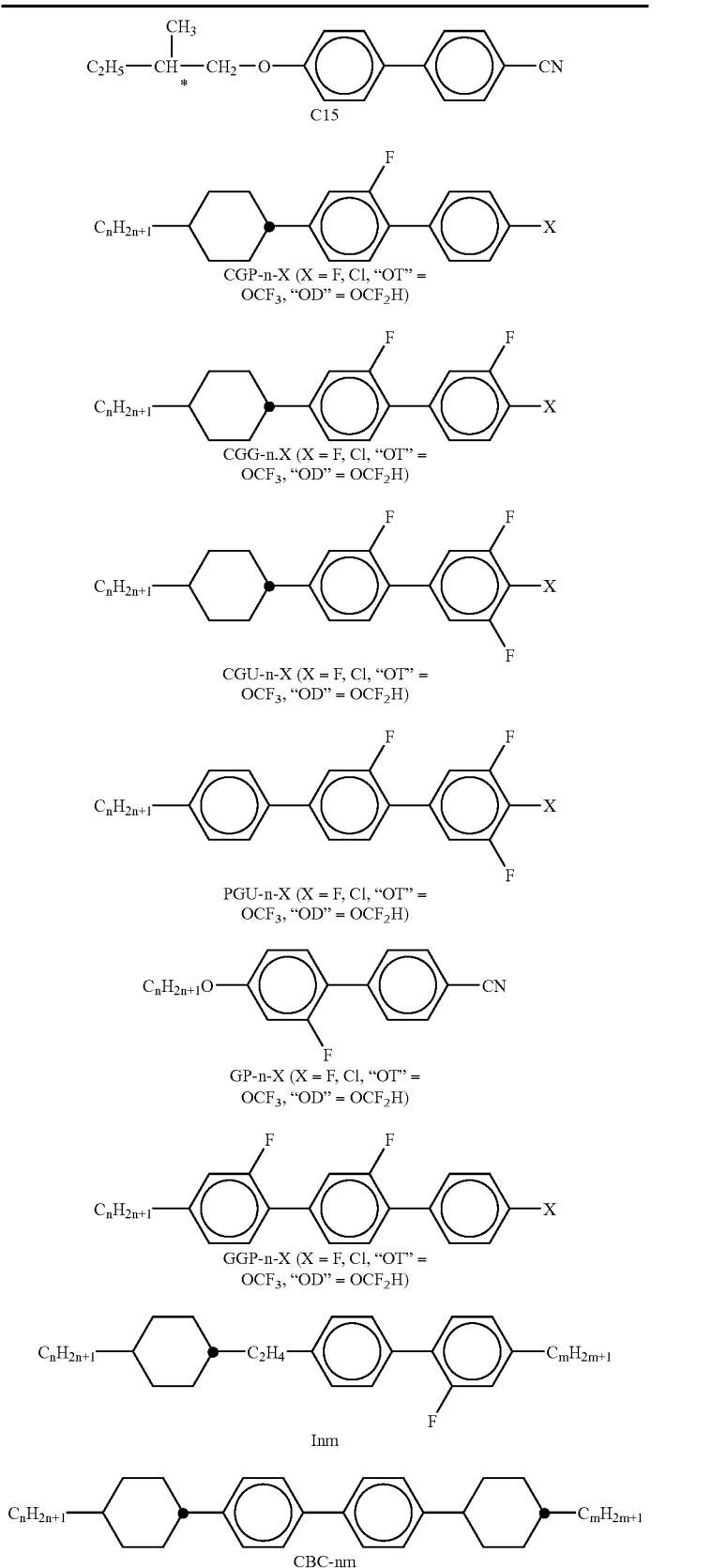

TABLE B-continued
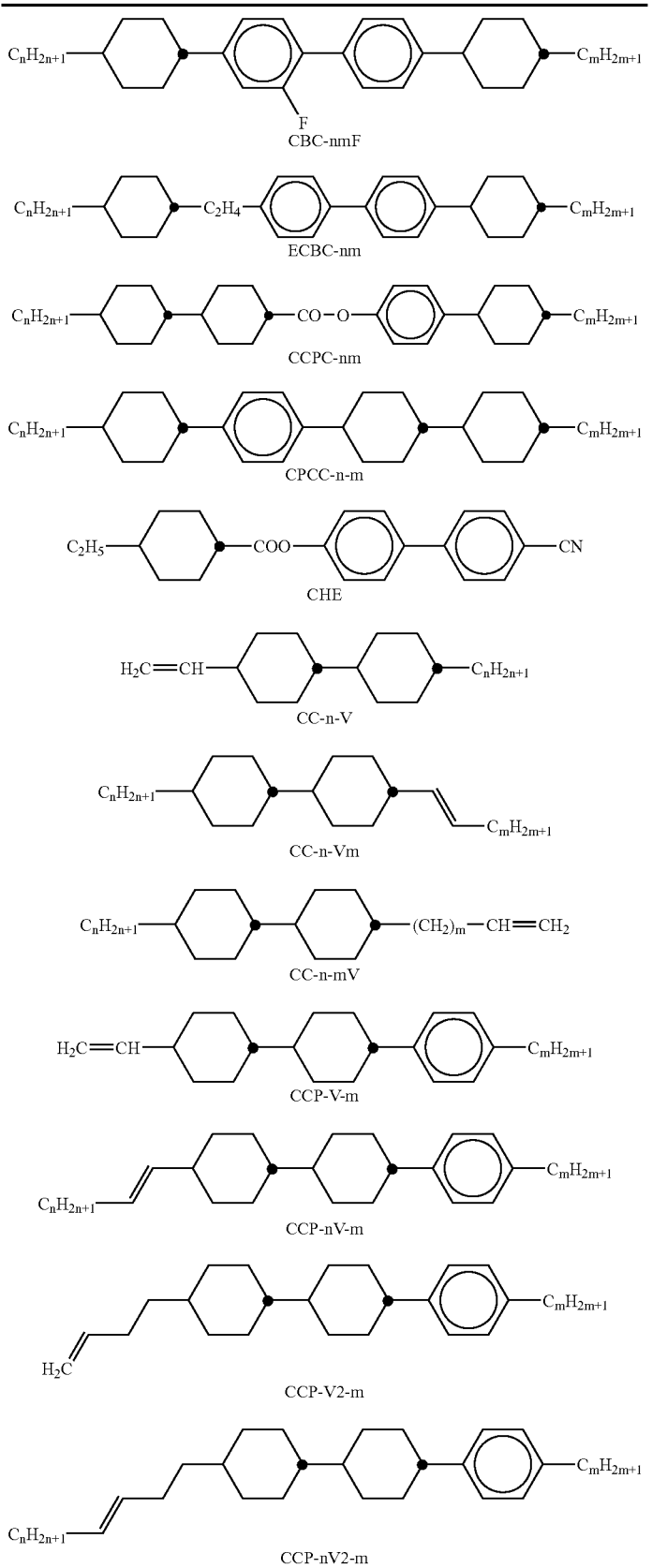

TABLE B-continued
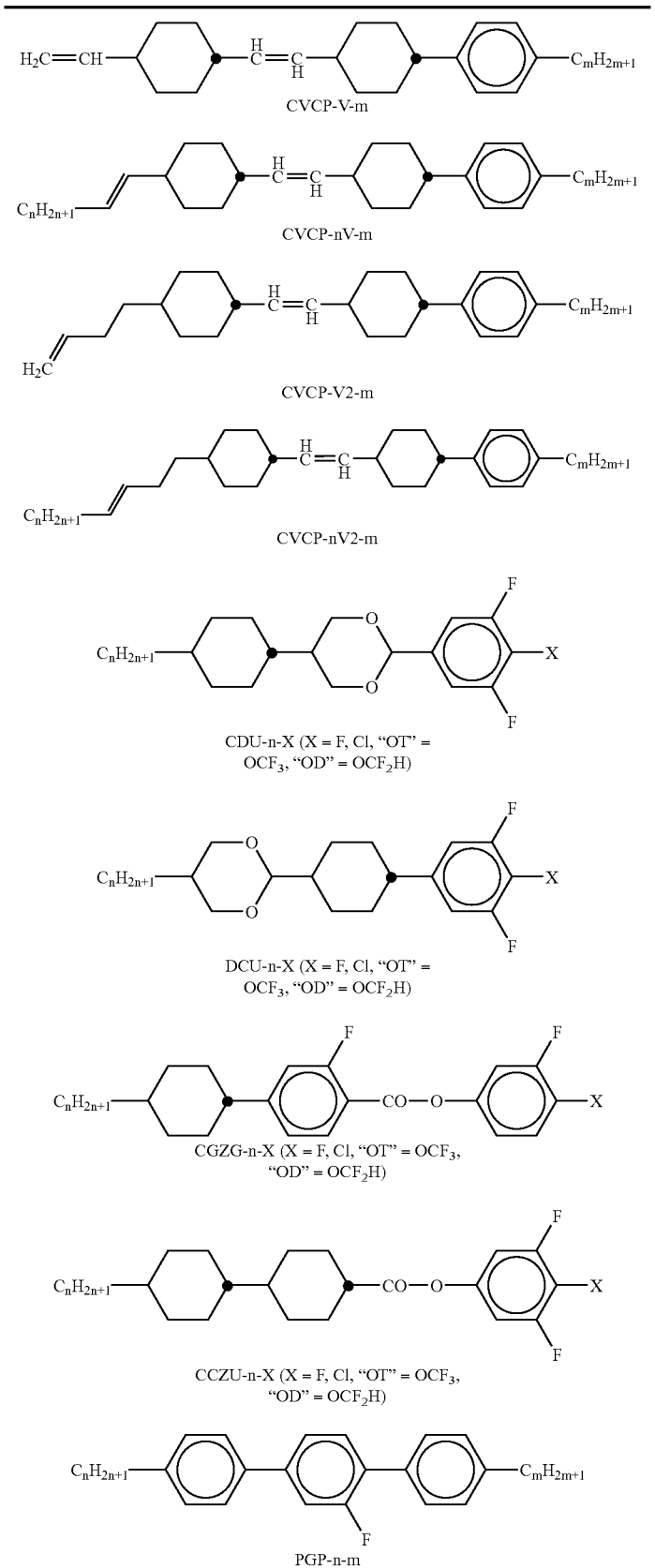

TABLE B-continued
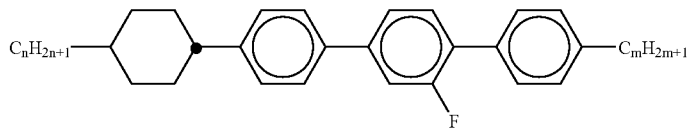
CPGP-n-m
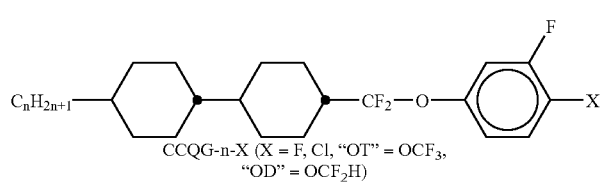
CCQG-n-X (X = F, Cl, "OT" = OCF₃, "OD" = OCF₂H)
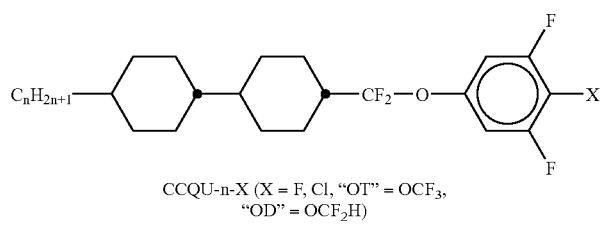
CCQU-n-X (X = F, Cl, "OT" = OCF₃, "OD" = OCF₂H)
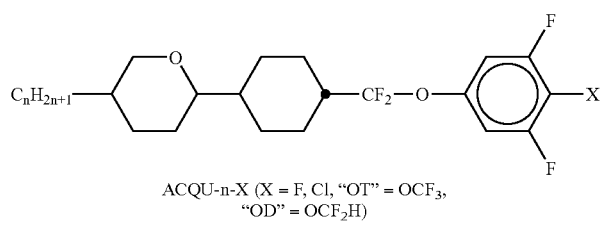
ACQU-n-X (X = F, Cl, "OT" = OCF₃, "OD" = OCF₂H)
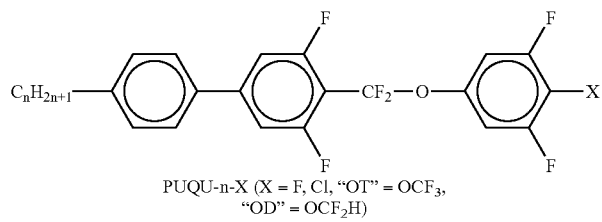
PUQU-n-X (X = F, Cl, "OT" = OCF₃, "OD" = OCF₂H)
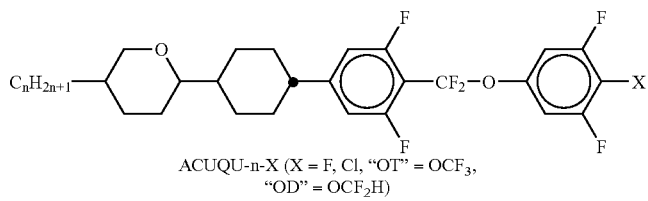
ACUQU-n-X (X = F, Cl, "OT" = OCF₃, "OD" = OCF₂H)
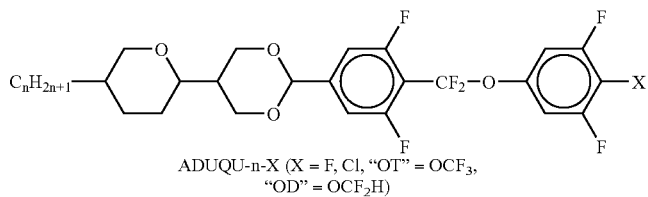
ADUQU-n-X (X = F, Cl, "OT" = OCF₃, "OD" = OCF₂H)
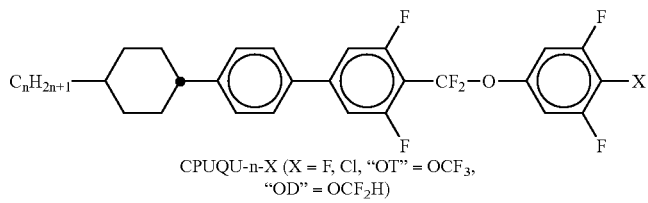
CPUQU-n-X (X = F, Cl, "OT" = OCF₃, "OD" = OCF₂H)

TABLE B-continued
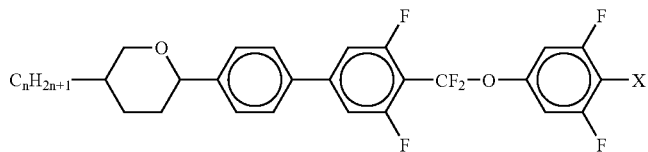
APUQU-n-X (X = F, Cl, "OT" = OCF₃, "OD" = OCF₂H)
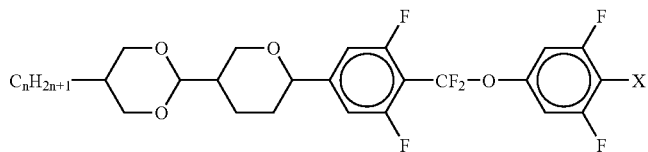
DAUQU-n-X (X = F, Cl, "OT" = OCF₃, "OD" = OCF₂H)
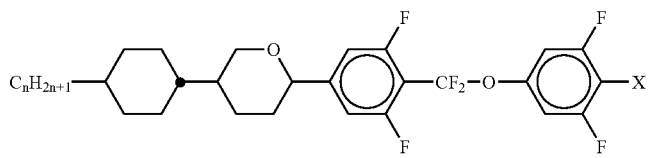
CAUQU-n-X (X = F, Cl, "OT" = OCF₃, "OD" = OCF₂H)
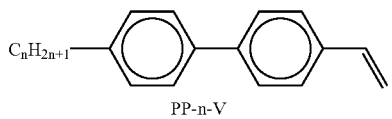
PP-n-V
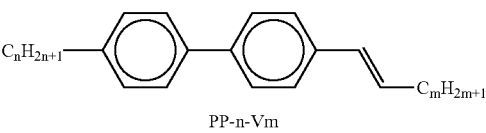
PP-n-Vm
$C_nH_{2n+1}$—⌬—⌬—CH₂CH₂CH=CH₂
PP-n-2V
$C_nH_{2n+1}$—⌬—⌬—CH₂CH₂CH=CH—$C_mH_{2m+1}$
PP-n-2Vm
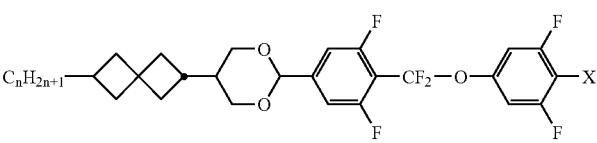
SDUQU-n-X (X = F, Cl, "OT" = OCF₃, "OD" = OCF₂H)

The liquid crystal media according to the instant invention contain preferably
- seven or more, preferably eight or more compounds, preferably of different formulae, selected from compounds of tables A and B and/or
- one or more, more preferably two or more, preferably three or more compounds, preferably of different formulae, selected from compounds of table A and/or
- three or more, more preferably four or more compounds, more preferably five or more compounds, preferably of different formulae, selected from the group of compounds of table B.

EXAMPLES

The examples given in the following are illustrating the present invention without limiting it in any way.

However, the physical properties and compositions illustrate, which properties can be achieved and in which ranges they can be modified. Especially the combination of the various properties, which can be preferably achieved, is thus well defined.

Example 1

A liquid crystal mixture is realized with the composition and properties given in the following table.

| No. | Composition Compound Abbreviation | Conc./% |
|---|---|---|
| 1 | SDUQU-3-F | 7.50 |
| 2 | CCZU-3-F | 5.00 |
| 3 | CDU-2-F | 3.50 |
| 4 | PUQU-2-F | 9.50 |
| 5 | PUQU-3-F | 9.00 |
| 6 | CC-3-V1 | 11.00 |
| 7 | CC-3-V | 35.00 |
| 8 | CCP-V-1 | 9.50 |
| 9 | CCP-V2-1 | 10.00 |
| Σ | | 100.00 |

| Physical Properties | |
|---|---|
| T (N, I) = | 69.5° C. |
| $n_e$ (20° C., 589.3 nm) = | 1.5619 |
| $\Delta n$ (20° C., 589.3 nm) = | 0.0825 |
| $\epsilon_\parallel$ (20° C., 1 kHz) = | 10.6 |
| $\Delta\epsilon$ (20° C., 1 kHz) = | 7.3 |
| $\gamma_1$ (20° C.) = | 53 mPa·s |
| $k_1$ (20° C.) = | 11.6 pN |
| $k_3/k_1$ (20° C.) = | 1.16 |
| $V_0$ (20° C.) = | 1.32 V |

This mixture has a favorably low value of $\Delta n$, a moderately high value of $\Delta\epsilon$ and a very low rotational viscosity. Thus, it is very well suited for displays operating in the IPS mode.

Example 2

A liquid crystal mixture is realized with the composition and properties given in the following table.

| No. | Composition Compound Abbreviation | Conc./% |
|---|---|---|
| 1 | SDUQU-3-F | 7.00 |
| 2 | CCP-3OCF3 | 6.00 |
| 3 | PGU-2-F | 9.00 |
| 4 | PUQU-2-F | 8.00 |
| 5 | PUQU-3-F | 9.50 |
| 6 | CC-3-V1 | 13.00 |
| 7 | CC-4-V | 14.00 |
| 8 | CC-5-V | 9.00 |
| 9 | CCP-V-1 | 11.50 |
| 10 | CCP-V2-1 | 10.00 |
| 11 | PCH-302 | 3.00 |
| Σ | | 100.00 |

| Physical Properties | |
|---|---|
| T (N, I) = | 74.0° C. |
| $n_e$ (20° C., 589.3 nm) = | 1.5835 |
| $\Delta n$ (20° C., 589.3 nm) = | 0.0981 |
| $\epsilon_\parallel$ (20° C., 1 kHz) = | 11.6 |
| $\Delta\epsilon$ (20° C., 1 kHz) = | 8.1 |
| $\gamma_1$ (20° C.) = | 68 mPa·s |
| $k_1$ (20° C.) = | 12.2 pN |
| $k_3/k_1$ (20° C.) = | 0.97 |
| $V_0$ (20° C.) = | 1.31 V |

This mixture has a rather low value of $\Delta n$, a rather high value of $\Delta\epsilon$ and a low rotational viscosity. Thus, it is very well suited for displays operating in the IPS mode.

The entire disclosures of all applications, patents and publications, cited herein and of corresponding European application No. 06007391.3, filed Apr. 7, 2006, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid crystal medium comprising
a first dielectrically positive component, component A, which comprises one or more dielectrically positive compounds of formula I

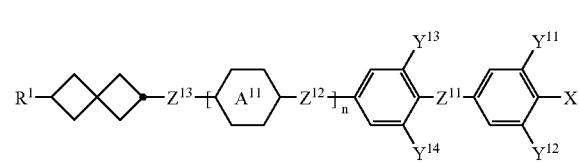

wherein
$R^1$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,

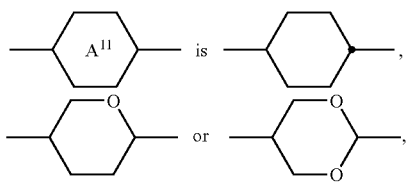

$X^1$ is halogen, halogenated alkyl or alkoxy with 1 to 6 C-atoms or halogenated alkenyl or alkenyloxy with 2 to 6 C-atoms, $Y^{11}$ to $Y^{14}$ are, independently of each other, H or F, $Z^{11}$ to $Z^{13}$ are, independently of each other, —CH$_2$CH$_2$—, —CF$_2$CF$_2$—, —COO—, trans- —CH=CH—, trans- —CF=CF—, —CH$_2$O—, —O CH$_2$—, —CF$_2$O—, —O CF$_2$— or a single bond, and n is 0 or 1 and optionally, a second dielectrically positive component, component B, which comprises one or more dielectrically positive compounds having a dielectric anisotropy of more than 3, from which compounds of formula I are excluded, and optionally a dielectrically neutral component, component C, which comprises one or more dielectrically neutral compounds of formula IV

IV wherein $R^{41}$ and $R^{42}$ are, independently of each other, alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, p is 0, 1 or 2,

 and 

are, independently of each other, and in case

is present twice, also these, independently of each other,

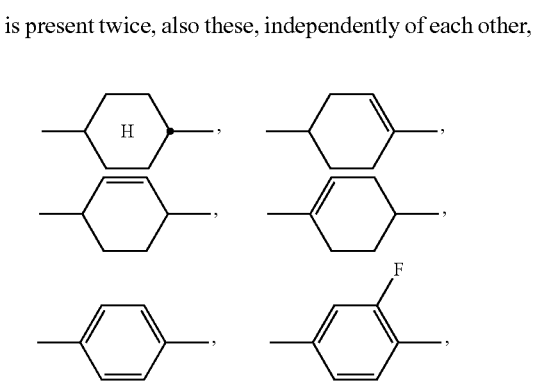

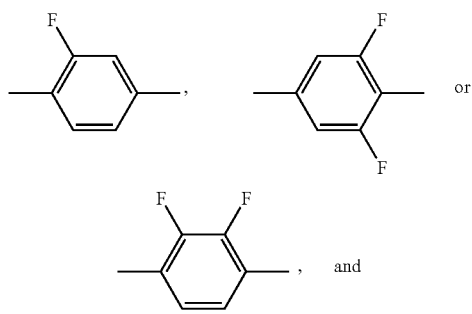

$Z^{41}$ and $Z^{42}$ are, independently of each other, and in case $Z^{41}$ is present twice, also these independently of each other, —CH$_2$CH$_2$—, —COO—, trans- —CH=CH—, trans- —CF=CF—, —CH$_2$O—, —CF$_2$O— or a single bond.

2. A liquid crystal medium according to claim 1, wherein component B comprises one or more compounds of formulae II or III

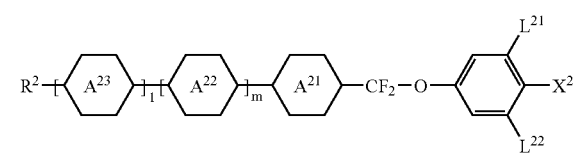

II

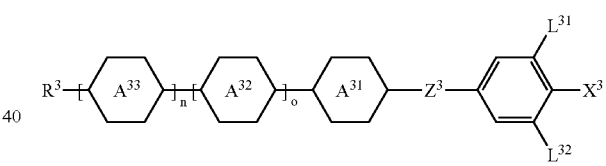

III wherein $R^2$ and $R^3$ are, independently of each other, alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,

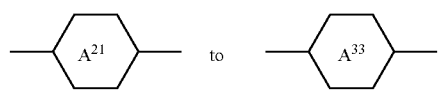

are, independently of each other,

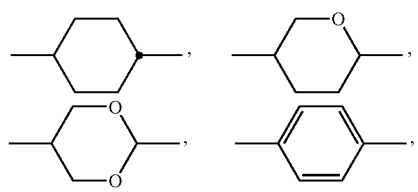

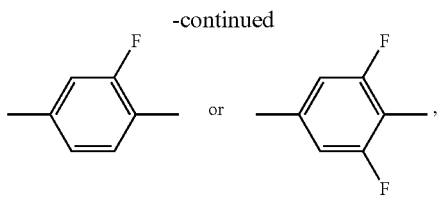 or , $L^{21}$, $L^{22}$, $L^{31}$ and $L^{32}$ are, independently of each other, H or F, $X^2$ and $X^3$ are, independently of each other, halogen, halogenated alkyl or alkoxy with 1 to 6 C-atoms or halogenated alkenyl or alkenyloxy with 2 to 6 C-atoms, $Z^3$ is —CH$_2$CH$_2$—, —CF$_2$CF$_2$—, —COO—, trans- —CH=CH—, trans —CF=CF—, —CH$_2$O— or a single bond, and l, m, n and o are, independently of each other, 0 or 1.

3. A liquid crystal medium according to claim 1, wherein the concentration of component A in the medium is 5% to 60% by weight.

4. A liquid crystal medium according to claim 1, wherein component A comprises one or more compounds of formula I'

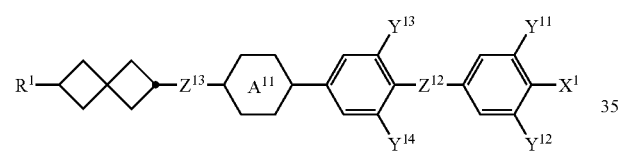

I' wherein

R$^1$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,

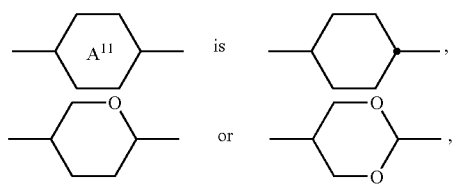

$X^1$ is halogen, halogenated alkyl or alkoxy with 1 to 6 C-atoms or halogenated alkenyl or alkenyloxy with 2 to 6 C-atoms, $Y^{11}$ to $Y^{14}$ are, independently of each other, H or F, and $Z^{12}$ to $Z^{13}$ are, independently of each other, —CH$_2$CH$_2$—, —CF$_2$CF$_2$—, —COO—, trans- —CH=CH—, trans- —CF=CF—, —CH$_2$O—, —O CH$_2$—, —CF$_2$O—, —O CF$_2$— or a single bond.

5. A liquid crystal medium comprising a first dielectrically positive component, component A, which comprises one or more compounds of formulae I-1, I-2, I-3, I-4, I-5, I-6, I-7, I-8 or I-9

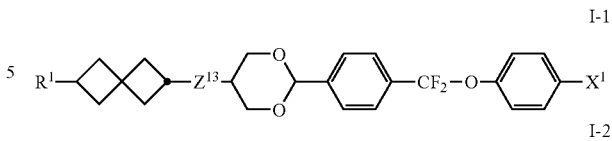

I-1

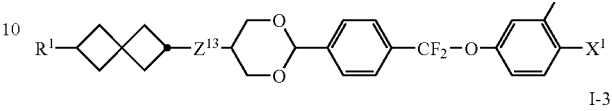

I-2

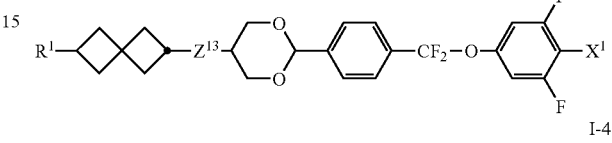

I-3

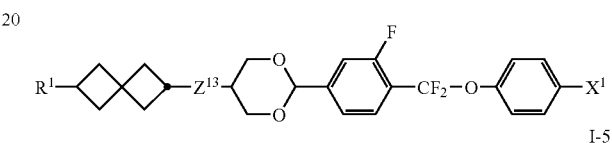

I-4

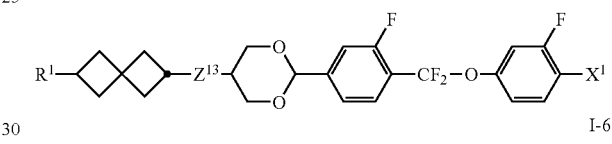

I-5

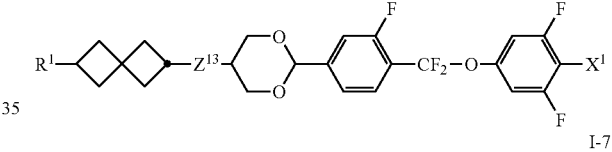

I-6

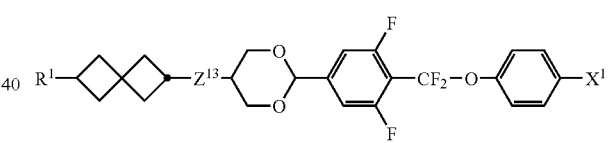

I-7

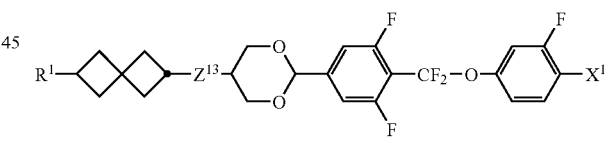

I-8

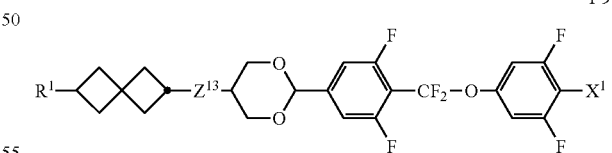

I-9 wherein

R$^1$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, $X^1$ is halogen, halogenated alkyl or alkoxy with 1 to 6 C-atoms or halogenated alkenyl or alkenyloxy with 2 to 6 C-atoms, and $Z^{13}$ is —CH$_2$CH$_2$—, —CF$_2$CF$_2$—, —COO—, trans- —CH=CH—, trans- —CF=CF—, —CH$_2$O—, —O CH$_2$—, —CF$_2$O—, —O CF$_2$— or a single bond, and optionally, a second dielectrically positive component, component B, which comprises one or more dielectrically positive compounds having a dielectric anisotropy of more than 3, from which compounds of formula I are excluded, and optionally a dielectrically neutral component, component C, which comprises one or more dielectrically neutral compounds of formula IV

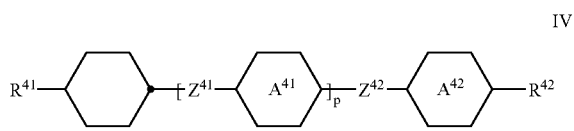

IV wherein

R$^{41}$ and R$^{42}$ are, independently of each other, alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, p is 0, 1 or 2,

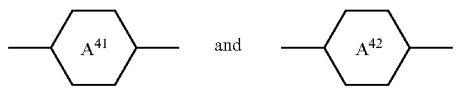

are, independently of each other, and in case

is present twice, also these, independently of each other,

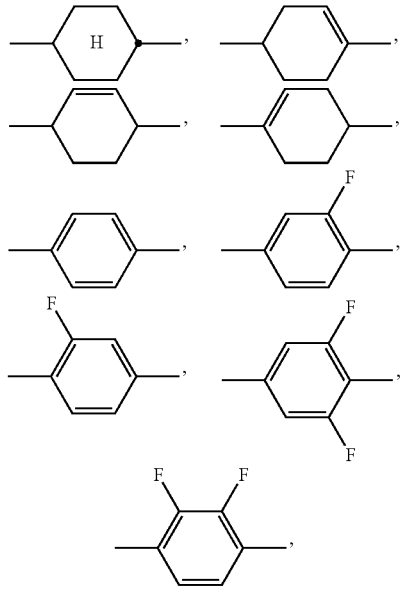

Z$^{41}$ and Z$^{42}$ are, independently of each other, and in case Z$^{41}$ is present twice, also these, independently of each other, —CH$_2$CH$_2$—, —COO—, trans- —CH=CH—, trans- —CF=CF—, —CH$_2$O—, —CF$_2$O— or a single bond.

6. A liquid crystal medium according to claim 2, which comprises one or more compounds of formula II.

7. A liquid crystal medium according to claim 2, which comprises one or more compounds of formula III.

8. A liquid crystal medium according to claim 1, which comprises one or more dielectrically neutral compounds of formula IV.

9. A liquid crystal medium according to claim 1, further comprising a component D, which comprises one or more compounds of formula VI

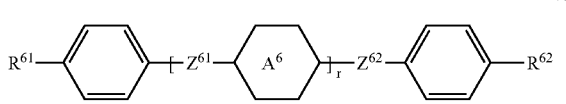

VI wherein

R$^{61}$ and R$^{62}$ are, independently of each other, alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, r is 0, 1 or 2

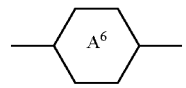

is, in case it is occurring twice in each occurrence independently of each other,

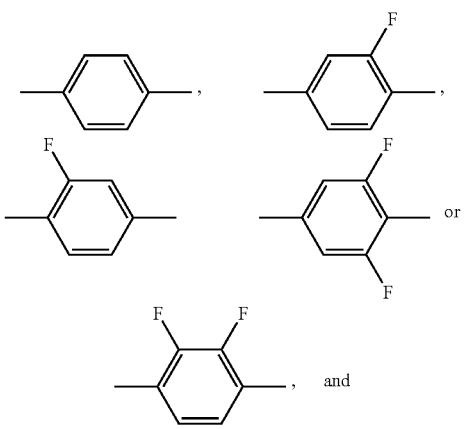

Z$^{61}$ and Z$^{62}$ are, independently of each other, and in case Z$^{61}$ is present twice, also these independently of each other, —CH$_2$CH$_2$—, —COO—, trans- —CH=CH—, trans- —CF=CF—, —CH$_2$O—, —CF$_2$O— or a single bond.

10. A liquid crystal display, comprising a liquid crystal medium according to claim 1.

11. A liquid crystal display according to claim 9, which is addressed by an active matrix.

12. A compound of formula I

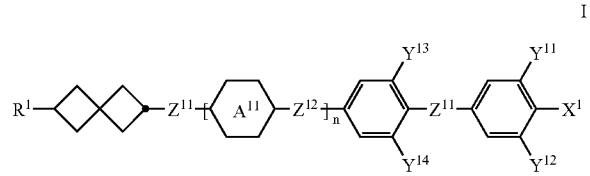

wherein
$R^1$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,

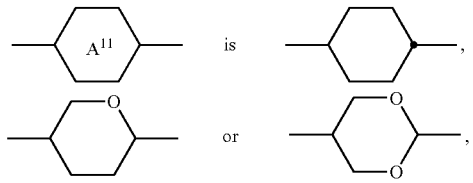

$X^1$ is halogen, halogenated alkyl or alkoxy with 1 to 6 C-atoms or halogenated alkenyl or alkenyloxy with 2 to 6 C-atoms,
$Y^{11}$ to $Y^{14}$ are, independently of each other, H or F,
$Z^{11}$ to $Z^{13}$ are, independently of each other, —$CH_2CH_2$—, —$CF_2CF_2$—, —COO—, trans- —CH=CH—, trans- —CF=CF—, —$CH_2O$—, —O $CH_2$—, —$CF_2O$—, —O $CF_2$— or a single bond, and
n is 0 or 1.

13. A liquid crystal medium according to claim 1, wherein

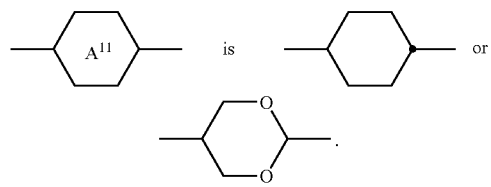

14. A compound of claim 12, wherein

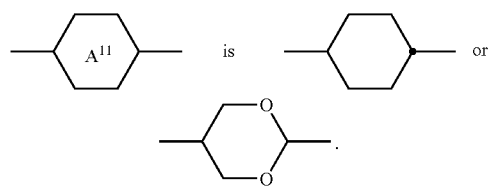

15. A liquid crystal medium according to claim 1, wherein component A comprises one or more compounds of formulae I-1, I-2, I-3, I-4, I-5, I-6, I-7, I-8 or I-9

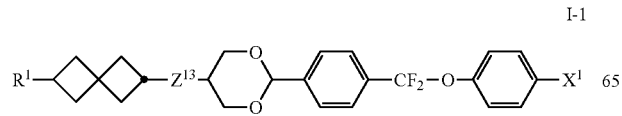

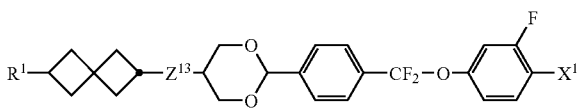

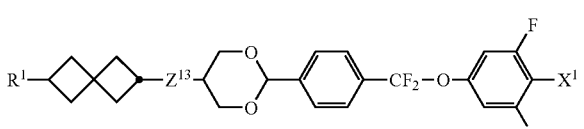

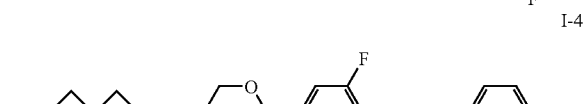

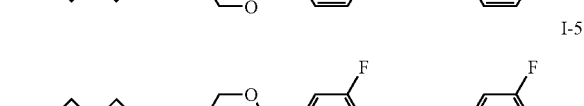

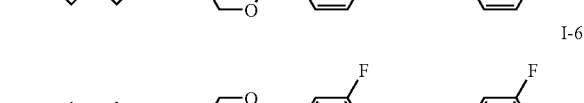

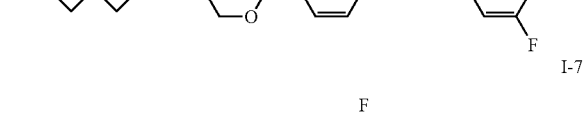

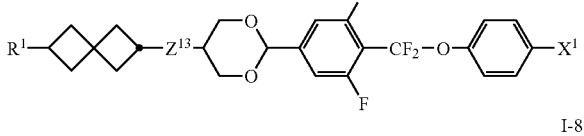

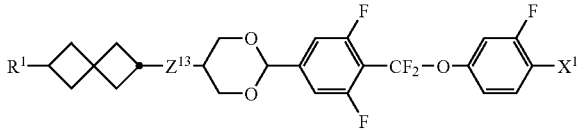

wherein
$R^1$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,
$X^1$ is halogen, halogenated alkyl or alkoxy with 1 to 6 C-atoms or halogenated alkenyl or alkenyloxy with 2 to 6 C-atoms, and
$Z^{13}$ is —$CH_2CH_2$—, —$CF_2CF_2$—, —COO—, trans- —CH=CH—, trans- —CF=CF—, —$CH_2O$—, —O $CH_2$—, —$CF_2O$—, —O $CF_2$— or a single bond, and
wherein the dioxane-2,5-diyl ring in formulae I-1 to I-9 is optionally replaced by a cyclohexane-1,4-diyl ring or by a tetrahydropyrane-2,5-diyl ring.

16. A liquid crystal medium according to claim 1, wherein $X^1$ is F, Cl, —$OCF_3$ or —$CF_3$.

17. A liquid crystal medium according to claim 1, wherein $R^{41}$ is alkyl and $R^{42}$ is alkoxy.

18. A liquid crystal medium according to claim 5, wherein component B comprises one or more compounds of formulae II or III

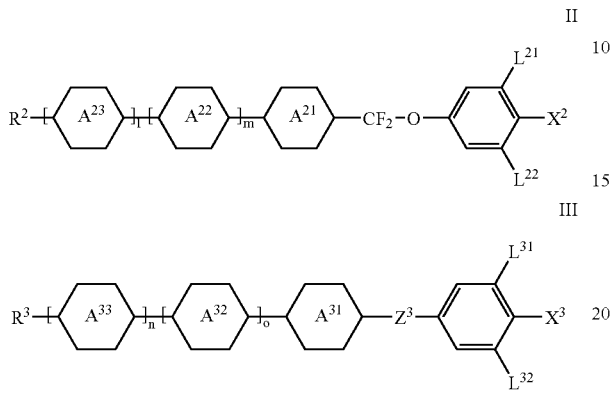

wherein $R^2$ and $R^3$ are, independently of each other, alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,

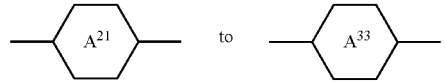

are, independently of each other,

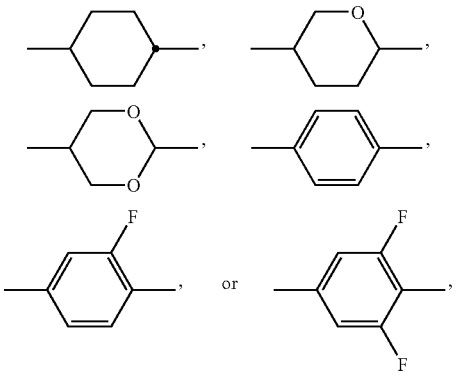

$L^{21}$, $L^{22}$, $L^{31}$ and $L^{32}$ are, independently of each other, H or F, $X^2$ and $X^3$ are, independently of each other, halogen, halogenated alkyl or alkoxy with 1 to 6 C-atoms or halogenated alkenyl or alkenyloxy with 2 to 6 C-atoms, $Z^3$ is —$CH_2CH_2$—, —$CF_2CF_2$—, —COO—, trans- —CH=CH—, trans —CF=CF—, —$CH_2O$— or single bond, and l, m, n and o are, independently of each other, 0 or 1.

19. A liquid crystal medium according to claim 18, which comprises one or more dielectrically neutral compounds of formula IV.

20. A liquid crystal display, comprising a liquid crystal medium according to claim 5.

* * * * *